US012762390B2

(12) United States Patent
Buckley et al.

(10) Patent No.: US 12,762,390 B2
(45) Date of Patent: Oct. 13, 2026

(54) SYSTEM AND METHOD FOR PARAMETER MULTIPLEXED GRADIENT DESCENT

(71) Applicant: Government of the United States of America, as represented by the Secretary of Commerce, Gaithersburg, MD (US)

(72) Inventors: Sonia Mary Buckley, Buena Vista, CO (US); Adam Nykoruk McCaughan, Denver, CO (US); Andrew Martin Dienstfrey, Louisville, CO (US); Sae Woo Nam, Boulder, CO (US)

(73) Assignee: GOVERNMENT OF THE UNITED STATES OF AMERICA, AS REPRESENTED BY THE SECRETARY OF COMMERCE, Gaithersburg, MD (US)

(*) Notice: Subject to any disclaimer, the term of this patent is extended or adjusted under 35 U.S.C. 154(b) by 707 days.

(21) Appl. No.: 18/223,663

(22) Filed: Jul. 19, 2023

(65) Prior Publication Data

US 2024/0028879 A1 Jan. 25, 2024

Related U.S. Application Data

(60) Provisional application No. 63/368,800, filed on Jul. 19, 2022.

(51) Int. Cl.
*G06N 3/063* (2023.01)
*G06N 3/048* (2023.01)

(52) U.S. Cl.
CPC ............ *G06N 3/063* (2013.01); *G06N 3/048* (2023.01)

(58) Field of Classification Search
CPC ......... G06N 3/063; G06N 3/048; G06N 3/084
See application file for complete search history.

(56) References Cited

U.S. PATENT DOCUMENTS

2021/0350267 A1* 11/2021 Leleu .................. G06F 15/7892

FOREIGN PATENT DOCUMENTS

WO WO-2021050526 A1 * 3/2021 ............ G06N 3/067

OTHER PUBLICATIONS

Soudry, Daniel, et al. "Memristor-based multilayer neural networks with online gradient descent training." IEEE transactions on neural networks and learning systems 26.10 (2015): 2408-2421 (Year: 2015).*

(Continued)

*Primary Examiner* — Michael J Huntley
*Assistant Examiner* — Alfredo Campos
(74) *Attorney, Agent, or Firm* — Office of Chief Counsel for National Institute of Standards and Technology

(57) ABSTRACT

Embodiments of the present invention relate to systems and model-free methods for perturbing neural network hardware parameters and measure the neural network response that are implemented natively within the neural network hardware and without requiring a knowledge of the internal structure of the network. Embodiments of the present invention also relate to systems and methods for configuring neural network hardware such that the network automatically performs parameter multiplexed gradient descent, which include adding a time-varying perturbation to each hardware parameter base value to modulate the cost, broadcasting the modulated cost signal to all hardware parameters, and filtering out modulations so as to extract gradient information.

20 Claims, 18 Drawing Sheets

(56) References Cited

OTHER PUBLICATIONS

Kriegeskorte, Nikolaus, and Tal Golan. "Neural network models and deep learning." Current Biology 29.7 (2019): R231-R236. (Year: 2019).*
Sajjad Jalili, Mohammad Memarian, and Khashayar Mehrany, "Recycling forward and backward frequency-multiplexed modes in a waveguide coupled to phased time-perturbed microrings for low-footprint neuromorphic computing," Opt. Mater. Express 12, 1198-1213 (Year: 2022).*
Wright, L.G., et al., "Deep physical neural networks trained with backpropagation", Nature, 2022, p. 549-555, vol. 601.
Spall, J.C., et al., "An Overview of the Simultaneous Perturbation Method for Efficient Optimization", Johns Hopkins Apl Technical Digest, 1998, p. 482-492. vol. 19 No.4.
Dembo, A., et al., "Model-Free Distributed Learning", IEEE Transactions on Neural Networks, 1990, p. 58-70, vol. No. 1.
Adhikari, S.P., et al., "A Circuit-Based Learning Architecture for Multilayer Neural Networks With Memristor Bridge Synapses", IEEE Transactions on Circuits and Systems—I: Regular Papers, 2015, p. 215-223, vol. 62 No. 1.
Wang, C., et al., "Memristor-based neural networks with weight simultaneous perturbation training", Nonlinear Dyn, 2019, p. 2893-2906, vol. 95.
Yang, C., et al., "A Circuit-Based Neural Network with Hybrid Learning of Backpropagation and Random Weight Change Algorithms", Sensors, 2017, p. 1-18.
Bandyopadhyay, S., et al. "Single chip photonic deep neural network with accelerated training." ArXiv abs/2208.01623, 2022, Accessed Jul. 18, 2023, DOI: https://doi.org/10.48550/arXiv.2208.01623.
Buckley, S., et al., "A general approach to fast online training of modern datasets on real neuromorphic systems without backpropagation", ICONS '22: Proceedings of the International Conference on Neuromorphic Systems 2022, 2022, p. 1-8, Accessed Jul. 18, 2023, DOI: https://doi.org/10.1145/3546790.3546810.
Mccaughan, A.N., et al., "Multiplexed gradient descent: Fast online training of modern datasets on hardware neural hetworks without backpropagation", APL Machine Learning, 2023, p. 026118, vol. 1.

* cited by examiner

SYSTEM AND METHOD FOR PARAMETER MULTIPLEXED GRADIENT DESCENT

CROSS-REFERENCE TO RELATED APPLICATION

This application claims the benefit of priority from U.S. Provisional Patent Application Ser. No. 63/368,800, filed on Jul. 19, 2022, the disclosure of which is incorporated herein by reference in its entirety.

STATEMENT REGARDING FEDERAL RIGHTS

The invention described herein was made with United States Government support from the National Institute of Standards and Technology (NIST), an agency of the United States Department of Commerce. The United States Government has certain rights in the invention.

FIELD OF THE INVENTION

The present invention relates generally to neural networks, and more particularly, to machine learning algorithms for training neural networks.

BACKGROUND OF THE INVENTION

Artificial neural networks are increasingly being used as preferred architectures for many computational applications. Mathematical representations of neural networks have been implemented in software with some success. Software-implemented neural networks are flexible in that they can be "trained" to solve many different problems but often at a significant energy cost associated with both training and operation. A common method of implementing a high-performance neural network in a hardware is to train a specific network for a specific task, and then hard code that solution directly into the hardware. While this technique can produce high computing efficiency for a particular implementation, it results in a subsequent inability to reconfigure the network by changing weights, biases, or interconnections between neurons, or by adding or removing neurons. Furthermore, this technique often results in lower accuracy performance than anticipated due to device variability. Accordingly, there are many unsolved technical barriers in machine learning and neural networks and there is interest in hardware specifically built to perform machine learning, e.g., at faster rates or using less energy than other technology. These hardware machine learning systems are sometimes called neuromorphic systems.

Machine learning works in phases that include training and inference. In the training phase, a model is provided with a curated dataset so that it can learn to extract the desired information from the type of data it will analyze. Then, in the inference phase, the model can make predictions based on live data to produce results. However, in hardware implementations, the training phase can be difficult to accomplish and is inefficient on traditional digital hardware. This has led to significant efforts toward building custom hardware that can perform machine learning tasks at high speeds with lower energy costs. There are hardware platforms using analog, digital, or mixed-signal processing that potentially offer increased operational speeds and/or reduced energy costs. However, such hardware instantiations only perform the inference part of the machine learning algorithm, and a larger portion of the energy cost is spent training on datasets, typically via gradient descent. Backpropagation is a commonly used method of computing the gradient for gradient descent but is challenging to implement in hardware platforms. Training via gradient descent does not require backpropagation; backpropagation is only used to calculate the gradient. Other methods for computing the gradient in neural networks exist but are less efficient in software than backpropagation and are seldom used in machine learning applications.

Model-free methods that do not require knowledge of the internal structure of the network (e.g., topology, activation function, derivatives, etc.), having the capability to perturb network parameters and measure network response, and that can be used to efficiently train modern neural network architectures are of particular interest. In one example, finite-difference model-free method has been applied for chip-in-the-loop training. However, the requirements for extra memory at every synapse and global synchronization in finite-difference model-free method and other such disadvantages prevent its widespread implementation in hardware. Other model-free perturbative methods for neural networks have been investigated but are limited in scale and comprise small datasets with only a few neurons.

Accordingly, there is a need for a framework for implementing model-free perturbative methods in neuromorphic hardware platforms. There is a need for model-free methods for perturbing neural network hardware parameters and measure the neural network response without requiring a knowledge of the internal structure of the network.

SUMMARY OF THE INVENTION

Embodiments of the present invention relate to systems and model-free methods for perturbing neural network hardware parameters and measuring the neural network response that are implemented natively within the neural network hardware and without requiring a knowledge of the internal structure of the network. Embodiments of the present invention also relate to systems and methods for configuring neural network hardware such that the network automatically performs parameter multiplexed gradient descent, which include adding a time-varying perturbation to each hardware parameter base value to modulate the cost, broadcasting the modulated cost signal to all hardware parameters, and filtering out modulations so as to extract gradient information.

Embodiments of the present invention relate to a multiplexed gradient descent system for training a neural network implemented in a neuromorphic hardware, said system including an input layer comprising a first plurality of neurons configured to receive a plurality of input signals; a plurality of synaptic circuits for modulating at least one of a first plurality of neuromorphic hardware signals, wherein each of the plurality of synaptic circuit comprises a plurality of neuromorphic hardware elements for generating the at least one of the first plurality of the neuromorphic hardware signals, wherein the plurality of the neuromorphic hardware elements comprises a first plurality of neuromorphic hardware parameters for setting the modulation of the at least one of the first plurality of the neuromorphic hardware signals to a predetermined value; a second plurality of neurons for generating a second plurality of neuromorphic hardware signals from the modulated first plurality of the neuromorphic hardware signals, wherein each of the second plurality of the neuromorphic hardware signals is a nonlinear function of the at least one of the first plurality of the neuromorphic hardware signals; a third plurality of neurons for generating a plurality of output signals from the second plurality of the neuromorphic hardware signals, wherein the plurality of the output signals represent a prediction of the neural network in the neuromorphic hardware; a cost element for comparing the plurality of the output signals with a target output to generate a plurality of costs, wherein comparing the plurality of the output signals with the target output comprises applying a plurality of cost functions to the plurality of the output signals and the target output, wherein each of the plurality of the cost function is a measure of correspondence between at least one of the plurality of the output signals and the target output; a filter for extracting a plurality of modulated cost functions, wherein extracting the plurality of modulated cost functions comprises determining a plurality of modulations in the plurality of the costs; a transmitter for transmitting the plurality of the modulated cost functions to the first plurality of the neuromorphic hardware parameters; an optimizer in at least one of the plurality of the synaptic circuits, including a perturbator for applying a perturbation to at least one of the first plurality of the neuromorphic hardware parameters, wherein applying the perturbation modifies the first plurality of the neuromorphic hardware parameters to a second plurality of neuromorphic hardware parameters; a receiver for receiving at least one of the plurality of the transmitted modulated cost functions; and a correlator for extracting a partial cost gradient from the at least one of the plurality of the received modulated cost functions, wherein extracting the partial cost gradient from the at least one of the plurality of the received modulated cost functions comprises determining an error signal for at least one of the second plurality of the neuromorphic hardware parameters, wherein determining the error signal for the at least one of the second plurality of the neuromorphic hardware parameters comprises applying a multiplier signal to each of the plurality of the received modulated cost functions to correlate the plurality of the received modulated cost functions with the second plurality of the neuromorphic hardware parameters; and an updater in at least one of the plurality of the synaptic circuits for determining a parameter change for the at least one of the second plurality of the neuromorphic hardware parameters from the extracted partial cost gradient and updating the at least one of the second plurality of the neuromorphic hardware parameters with the parameter change to generate a third plurality of neuromorphic hardware parameters. More particularly, the perturbation is a time-varying perturbation.

In one aspect of the present invention, the perturbation is a discrete perturbation. In one embodiment, the perturbation is time-multiplexing. In another embodiment, the perturbation is code-multiplexing.

In another aspect of the present invention, the perturbation is an analog perturbation. In one embodiment, the perturbation is frequency multiplexing.

Another embodiment of the present invention relates to a multiplexed gradient descent method for training a neural network implemented in a neuromorphic hardware, the method including receiving a first plurality of input signal from an input layer comprising a first plurality of neurons; modulating at least one of a first plurality of neuromorphic hardware signals generated by at least one of a first plurality of hardware elements in at least one of a plurality of synaptic circuits, wherein the at least one of the first plurality of neuromorphic hardware signals is modulated to a predetermined value set by a first plurality of neuromorphic hardware parameters; applying a first perturbation to each of the first plurality of the neuromorphic hardware parameters, wherein the applying the perturbation modifies the first plurality of the neuromorphic hardware parameters to a second plurality of neuromorphic hardware parameters; generating at a second plurality of neurons a second plurality of neuromorphic hardware signals from the modulated first plurality of the neuromorphic hardware signals, wherein each of the second plurality of the neuromorphic hardware signals is a nonlinear function of the at least one of the modulated first plurality of the neuromorphic hardware signals; generating at a third plurality of neurons a plurality of output signals from the second plurality of the neuromorphic hardware signals, wherein the plurality of the output signals represent a prediction of the neural network in the neuromorphic hardware; comparing at a cost element the plurality of the output signals with a target output to generate a plurality of costs, wherein comparing the plurality of the output signals with the target output comprises applying a plurality of cost functions to the plurality of the output signals and the target output, wherein each of the plurality of the cost function is a measure of correspondence between at least one of the plurality of the output signals and the target output; extracting a plurality of modulated cost functions, wherein extracting the plurality of the modulated cost functions comprises determining a plurality of modulations in the plurality of the costs; transmitting the plurality of the modulated cost functions to the second plurality of the neuromorphic hardware parameters; receiving in at least one of the plurality of the synaptic circuits at least one of the plurality of the transmitted modulated cost functions; extracting in at least one of the plurality of the synaptic circuits a partial cost gradient from the at least one of the plurality of the received modulated cost functions; determining in at least one of the plurality of the synaptic circuits a parameter change for the at least one of the second plurality of the neuromorphic hardware parameters from the extracted partial cost gradient; updating in at least one of the plurality of the synaptic circuits the at least one of the second plurality of the neuromorphic hardware parameters with the parameter change to generate a third plurality of neuromorphic hardware parameters; updating the first perturbation to a second perturbation after a first predetermined time period; repeating the extracting the partial cost gradient from the at least one of the plurality of the received modulated cost functions for a second predetermined time period; and receiving a second plurality of input signals and a second target output to the neuromorphic hardware after a third predetermined time period. More particularly, the perturbation is a time-varying perturbation. In one embodiment, the perturbation is time-multiplexing. In another embodiment, the perturbation is code-multiplexing. In yet another embodiment, the perturbation is frequency multiplexing.

In one aspect of the present invention, extracting the partial cost gradient from the at least one of the plurality of the received modulated cost functions comprises determining an error signal for the at least one of the second plurality of the neuromorphic hardware parameters, wherein determining the error signal for the at least one of the second plurality of the neuromorphic hardware parameters comprises applying a multiplier signal to each of the plurality of the received modulated cost functions to correlate the plurality of the received modulated cost functions with the second plurality of the neuromorphic hardware parameters.

Embodiments of the present invention also relate to a multiplexed gradient descent method for training a neural network implemented in a neuromorphic hardware, the method including receiving a first plurality of input signal from an input layer comprising a first plurality of neurons; modulating at least one of a first plurality of neuromorphic hardware signals generated by at least one of a first plurality of hardware elements in at least one of a plurality of synaptic circuits, wherein the at least one of the first plurality of the neuromorphic hardware signals is modulated to a predetermined value set by a first plurality of neuromorphic hardware parameters; generating at a second plurality of neurons a second plurality of neuromorphic hardware signals from the modulated first plurality of the neuromorphic hardware signals, wherein each of the second plurality of the neuromorphic hardware signals is a nonlinear function of the at least one of the modulated first plurality of the neuromorphic hardware signals; generating at a third plurality of neurons a plurality of output signals from the second plurality of the neuromorphic hardware signals, wherein the plurality of the output signals represent a prediction of the neural network in the neuromorphic hardware; comparing at a cost element the plurality of the output signals with a target output to generate a plurality of costs, wherein comparing the plurality of the output signals with the target output comprises applying a plurality of cost functions to the plurality of the output signals and the target output, wherein each of the plurality of the cost functions is a measure of correspondence between at least one of plurality of the output signals and the target output; extracting a plurality of modulated cost functions, wherein extracting the plurality of modulated cost functions comprises determining a plurality of modulations in the plurality of the costs; transmitting the plurality of the modulated cost functions to the first plurality of the neuromorphic hardware parameters; optimizing in at least one of the plurality of the synaptic circuits at least one of the plurality of the transmitted modulated cost functions to determine a parameter change for the at least one of the first plurality of the neuromorphic hardware parameters; and updating the at least one of the first plurality of the neuromorphic hardware parameters with the parameter change to generate a second plurality of neuromorphic hardware parameters.

In one aspect of the present invention, optimizing the transmitted modulated cost function includes receiving at each of the plurality of the synaptic circuits the at least one of the plurality of the transmitted modulated cost functions; applying a first perturbation to each of the first plurality of the neuromorphic hardware parameters; extracting a partial cost gradient from the at least one of the plurality of the received modulated cost functions, wherein the extracting the partial cost gradient from the at least one of the plurality of the received modulated cost functions comprises determining an error signal for the at least one of the perturbed first plurality of the neuromorphic hardware parameters, wherein determining the error signal for the at least one of the perturbed first plurality of the neuromorphic hardware parameters comprises applying a multiplier signal to each of the plurality of the received modulated cost functions to correlate the plurality of the received modulated cost functions with the perturbed first plurality of the neuromorphic hardware parameters; and determining the parameter change for the at least one of the first plurality of the neuromorphic hardware parameters from the extracted partial cost gradient.

In another aspect of the present invention, the multiplexed gradient descent method further includes updating the first perturbation to a second perturbation after a first predetermined time period; repeating the extracting the partial cost gradient from the at least one of the plurality of the received modulated cost functions for a second predetermined time period; and receiving a second plurality of input signals and a second target output to the neuromorphic hardware after a third predetermined time period.

DETAILED DESCRIPTION

Figure 1:
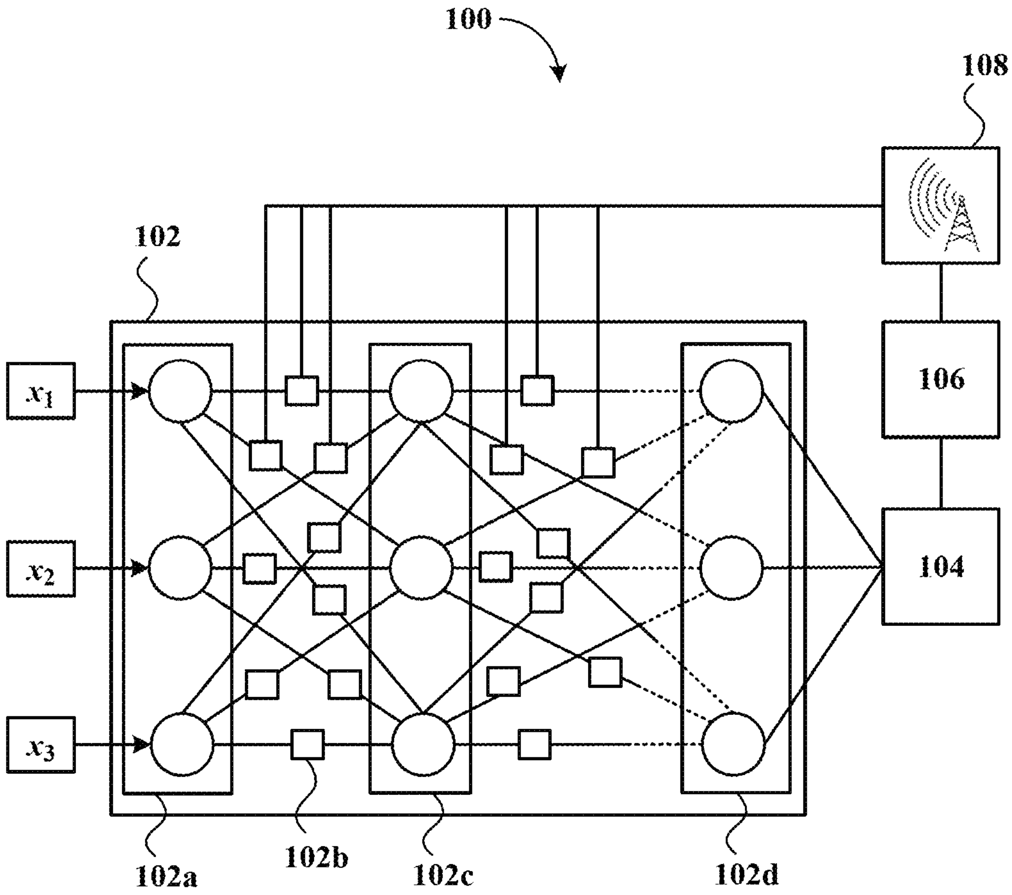
FIG. 1 illustrates a system for parameter multiplexed gradient descent in accordance with embodiments of the present invention.

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the present invention. Reference will now be made to the drawings wherein like numerals refer to like elements throughout.

Neurons in a neural network implemented in a neuromorphic hardware receive input signals x from neurons in a preceding layer and parameters θ (e.g., weights and biases) from synapses connecting the neurons to one or more neurons in the preceding layer. Once the neurons receive the inputs and parameters, the neurons add up each signal multiplied by its corresponding parameter and uses them to compute an output y=ƒ (x; θ) for the neuron. Each neuron in a neural network does not need to use every neuron in the preceding layer. The neural network must be trained such that the output signals of the network correspond to the desired target outputs $y_{target}$. The cost function is the measure of correspondence between network output and the target and is indicated by $C(y,y_{target})$ Cost function can be determined using any technique known in the art. A goal of the network is to minimize the value of the cost function. The cost function is minimized when neural network's predicted value is substantially close to the target output $y_{target}$. After determining an initial cost function for the neural network, changes are made to the neural network to determine whether those changes reduce the value of the cost function. In some embodiments, the parameters of each neuron at its synapse that communicate to the next layer of the network is modified to determine whether the cost function is reduced. The mechanism through which the parameters are modified to move the neural network to parameters with less error is called gradient descent. The gradient descent mechanism changes the parameters of each neuron's input signals and the process is continued until the decrease in the cost function caused by the change in the parameters is below a predetermined threshold. Gradient descent is performed by calculating the gradient dC/dθ and adjusting the parameters to minimize C.

Embodiments in accordance with the present invention provide a parameter-multiplexed gradient descent (PMGD) system and method for training a neural network in a neuromorphic hardware by: applying a perturbation $\tilde{\theta}_i$ to the base value of every hardware parameter $$\theta_i^0$$

in the neural network, which propagate through the neural network to influence the cost C; continuously determining the output y(t) and cost function C for the neural network; extracting time varying component $\tilde{C}$ of the cost function C due to the perturbations $\tilde{\theta}_i$, broadcasting the modulations to the input parameters $x_i$; extracting a partial cost gradient from the modulations; determining a parameter change for the hardware parameters; and updating the hardware parameters using the parameter change.

Figure 2:
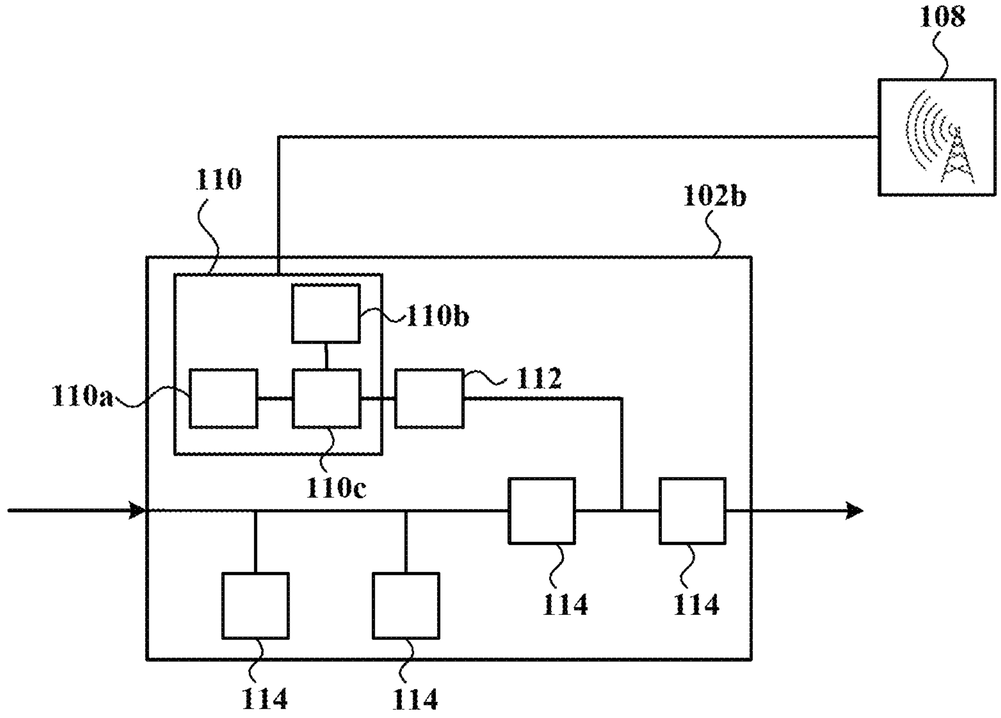
FIG. 2 illustrates a schematic representation of a synaptic circuit including an optimizer in accordance with embodiments of the present invention

Referring now to the drawings, and more particularly, to FIGS. 1 and 2, there is shown a PMGD system, generally designated 100 and schematically showing an embodiment of the present invention, for training a neural network in a neuromorphic hardware. PMGD system 100 includes a neural network 102 in a neuromorphic hardware, a global cost estimator 104, a filter 106, a transmitter 108, an optimizer 110, an updater 112, and neuromorphic hardware elements 114.

Neural network 102 includes an input layer 102*a* of neurons for receiving time-varying input signals x(t) and target output ŷ(t), synaptic circuits 102*b* for generating modulated neuromorphic hardware signals and for transmitting the modulated neuromorphic hardware signals to a subsequent layer of neurons, a middle layer 102*c* of neurons for generating neuromorphic hardware signals that is a non-linear function of the modulated neuromorphic hardware signals, and an output layer 102*d* of neurons for determining output signals y(t), representing a prediction of neural network 102, from the neuromorphic hardware signals generated by middle layer 102*c* of neurons. Each synaptic circuit 102*b* includes neuromorphic hardware elements 114 that generate neuromorphic hardware signals, as shown in FIG. 2. Neuromorphic hardware elements 114 include hardware parameters θ for setting the degree of modulation of neuromorphic hardware signals. Each synaptic circuit 102*b* further includes an optimizer 110 and updater 112, as shown in FIG. 2, for updating hardware parameters θ with a parameter change to generate updated neuromorphic hardware parameters.

Cost estimator 104 compares output signals y(t) with target $y_{target}(t)$ to determines a cost $C(t)=C(y(t), y_{target}(t))$. Cost estimator 104 compares output signals y(t) with target $y_{target}(t)$ by applying a cost function to each of the output signals y(t) with target $y_{target}(t)$ The cost function is a measure of correspondence between the output signals y(t) and target ŷ(t). In one embodiment of the present invention, cost $C(y(t), y_{target}(t))$ is determined by the difference between output y(t) and target $y_{target}(t)$.

To obtain target output ŷ(t), hardware parameters θ must be trained via gradient descent on cost C(y(t), ŷ(t)) such that combining the trained hardware parameters θ and inputs x(t) generate output signal y(t) that corresponds to $y_{target}(t)$ Optimizer 110 includes a perturbator 110*a* that adds a time-varying perturbation $\tilde{\theta}(t)$ to the base value $\theta_i$ of each hardware parameters θ of hardware elements 114 in a synaptic circuit 102*b*. Perturbations θ(t) from perturbator 110*a* of hardware parameters θ modulates cost C and that modulation is fed back to parameters θ. Perturbations $\tilde{\theta}(t)$ can have a variety of patterns. In one embodiment of the present invention, perturbations $\tilde{\theta}(t)$ from perturbator 110*a* can have discrete pattern (digital). Exemplary discrete patterns of perturbations $\tilde{\theta}(t)$ include time-multiplexing, code-multiplexing, and the like. In another embodiment of the present invention, perturbations $\tilde{\theta}(t)$ can have continuous pattern (analog). Exemplary continuous patterns of perturbations $\tilde{\theta}(t)$ include frequency multiplexing, and the like.

In embodiments of the present invention wherein perturbations $\tilde{\theta}(t)$ from perturbator 110*a* have a discrete pattern, the perturbed cost $\tilde{C}[t]$ due to the perturbation is determined by $\tilde{C}[t]=C[t]-C_0$, wherein $C_0$ is the unperturbed cost and C[t] is the cost at timestep t. In embodiments of the present invention wherein perturbations $\tilde{\theta}(t)$ from perturbator 110*a* have a continuous pattern, perturbator 110*a* modulates parameter $\theta_i$ at a frequency $\omega_1$ and amplitude Δθ to generate sinusoidal perturbation $\tilde{\theta}_i(t)=\Delta\theta \sin(\omega_i t)$. Modulating each parameter $\theta_i$ changes output y(t) and, in turn, changes cost C. Modulating parameter $\theta_i$ by frequencies $\omega_i$, $\omega_2$, $\omega_3$ and so forth will result in cost modulations $\tilde{C}(t)$ added to the baseline (unperturbed) cost $C_0$ such that cost $$C(t) = C_0 + \tilde{C}(t) = C_0 + \sum \Delta C_i \sin(\omega_i t), \quad (1)$$

wherein C(t) is the time-varying cost function, and $\Delta C_i$ is the amplitude change in cost C(t) due to perturbation $\tilde{\theta}_i(t)$ of parameter $\theta_i$.

Filter 106 extracts the time-varying modulation $\tilde{C}(t)$ in cost C(t) due to perturbation $\tilde{\theta}_i(t)$ of parameter $\theta_i$. In one embodiment of the present invention, filter 106 is a high pass filter.

Transmitter 108 transmits the time-varying modulations $\tilde{C}(t)$ extracted by filter 106 to all optimizers 110. In one embodiment of the present invention, transmitter 108 is a wireless transmitter. In another embodiment of the present invention, transmitter 108 is a wired transmitter. The time-varying modulations $\tilde{C}(t)$ transmitted by transmitter 108 is received by a receiver 110*b* included in optimizer 110.

To perform gradient descent on cost C(t), the gradient dC/dθ must be calculated and parameter $\theta_i$ adjusted to minimize cost C(t). The gradient dC/dθ is composed of partial gradients $\partial C/\partial\theta_i$ such that $dC/d\theta=(\partial C/\theta\theta_1, \partial C/\partial\theta_2, \ldots)$, the estimation of this gradient in neuromorphic hardware is denoted by G.

The time-varying modulation $\tilde{C}(t)$ transmitted by transmitter 108 includes contributions from parameters other than the ith parameter. Each parameter $\theta_i$ can compute its own partial derivative $\partial C/\partial\theta_i$ and autonomously update itself. For each parameter $\theta_i$, the contributions from other parameters to the time-varying modulation e (t) transmitted by transmitter 108 are unwanted. When perturbation $\tilde{\theta}_i(t)$ are small in amplitude and approximately orthogonal, the unwanted contributions from other parameters can be filtered out by integrating the product of its local perturbation $\tilde{\theta}_i(t)$ and global modulation $\tilde{C}(t)$ the parameter receives.

Optimizer 110 further includes a correlator 110*c* for extracting $\Delta C_i$ from the time-varying modulations $\tilde{C}(t)$ transmitted by transmitter 108 and received by a receiver 110*b*. Correlator 110*c* extracts $\Delta C_i$ by integrating the product of perturbation $\tilde{\theta}_i(t)$ and modulation $\tilde{C}(t)$ extracted by filter 106. The product $\tilde{C}(t)\tilde{\theta}_i(t)$ is referred to as error signal $e_i(t)$.

Figure 3:
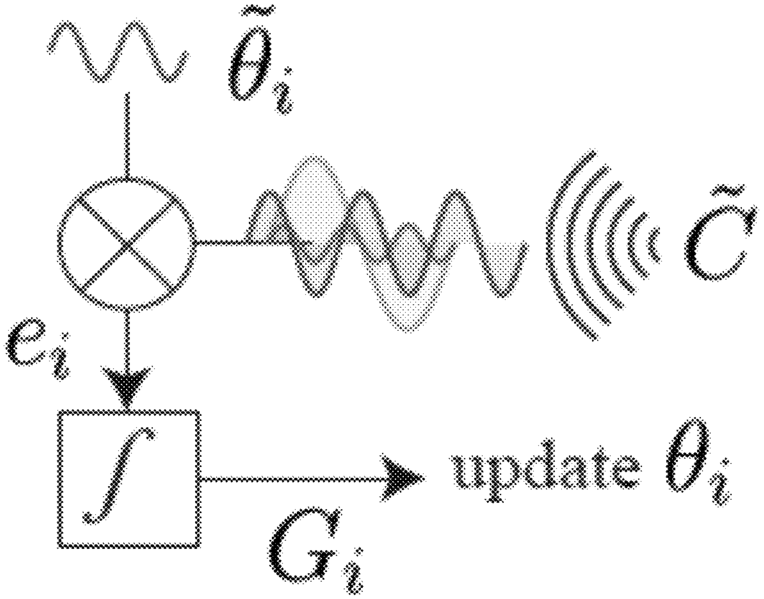
FIG. 3 illustrates a schematic representation of continuous error computing integration in accordance with embodiments of the present invention.

To ensure the magnitude of the perturbation does not affect the magnitude of the error, correlator 110*c* normalizes the product $\tilde{C}(t)\tilde{\theta}_i(t)$ by the square of the amplitude of the perturbation $\tilde{\theta}_i(t)$ and eliminates unwanted perturbations (frequencies) from other parameters via the following integration.

$$G_i = \int_{t=0}^{T} \frac{\tilde{C}(t)\tilde{\theta}_i(t)}{\Delta\theta_i^2} dt, \tag{2}$$

wherein $G_i$ is an approximation for the partial gradient for parameter $\theta_i$. FIG. 3 shows a schematic representation of correlator 110*c* for continuous error computing and integration in accordance with embodiments of the present invention. Correlator 110*c* continuously computes the error signal $e_i(t)$ and integrates over time to build up an approximation of the partial gradient $G_i$ for the parameter $\theta_i$. This integration produces the partial gradient approximation $G_i \propto \Delta C_i/\Delta\theta_i$. A longer parameter integration time provides better gradient approximations when the parameters are updated.

In one embodiment of the present invention, the integration takes the form of a homodyne detection, where unwanted perturbations (frequencies) from other parameters are eliminated via the following integration.

$$G_i = \frac{1}{\Delta\theta_i^2}\frac{1}{T}\int_{t=0}^{T}\sum_k \Delta C_k \sin(\omega_k t)\Delta\theta_i \sin(\omega_i t)dt = \frac{\Delta C_i}{\Delta\theta_i} \text{ as } T \to \infty, \tag{3}$$

wherein $$1/\Delta\theta_i^2$$

is a normalization constant. $G_i$ is an approximation for the partial gradient for parameter $\theta_i$, and approaches the exact gradient in the double limit as $T\to\infty$ and the amplitude of perturbation $\Delta\theta_i$–0.

Updater 112 uses the accumulated gradient approximation $G_i$ to determine a change in hardware parameters θ and update hardware parameters θ according to a gradient descent step $\theta_i \to \theta_i - \eta G_i$, where η is the learning rate. This includes determining updated perturbations $\tilde{\theta}_i(t)$ that perturbator 110*a* can apply to parameter $\theta_i$.

PMGD systems and methods in accordance with the present invention can be adapted to apply any collection of orthogonal and mean zero perturbations, including a variety of analog and discrete perturbations. In embodiments of the present invention wherein the perturbations are discrete, correlator 110*c* determines accumulation of gradient approximation by a summation of the error signal $e_i[t]$ in each discrete time step t as follows:

$$G_i[t] = G_i[t-1] + e_i[t], \tag{4}$$

wherein $$e_i[t] = \tilde{C}[t]\tilde{\theta}_i[t]/\Delta\theta_i^2.$$

After time $\tau_\theta$, updater 112 updates $$\theta_i^0 \to \theta_i^0 - \eta G_i[t],$$

where η is the learning rate, using accumulated gradient approximation $G_i[t]$ and resets $G_i[t]$ to zero.

In embodiments of the present invention wherein the perturbations are continuous perturbations (analog system), correlator 110*c* determines accumulation of gradient approximation $G_i(t)$ as follows:

$$G_i(t) = \int_0^t \left(e_i(s) - G_i(s)/\tau_\theta\right)ds, \tag{5}$$

wherein $$e_i(t) = \tilde{C}(t)\tilde{\theta}_i(t)/\Delta\theta_i^2,$$

$\tau_\theta$ is the gradient integration time, and $G_i(t)$ is not reset to zero. After time $\tau_\theta$, updater 112 updates $$\theta_i^0 \to \theta_i^0 - \eta G_i(t),$$

wherein η is the learning rate, using accumulated gradient approximation $G_i(t)$.

Perturbator 110*a* perturbs and updater 112 updates all the parameters simultaneously such that the resulting parameter update corresponds to gradient descent training of the entire network. Because all the parameters are perturbed and updated simultaneously, the gradient descent training in accordance with embodiments of the present invention is referred to as multiplexed gradient descent.

Perturbator 110*a* determines a timescale $\tau_p$ over which perturbations occur. In embodiments of the present invention wherein the perturbations are discrete perturbations (digital perturbations), perturbator 110*a* updates perturbations of each parameter to new values every timescale $\tau_p$. In embodiments of the present invention wherein the perturbations are continuous perturbations (analog perturbations), perturbator 110*a* determines a timescale $\tau_p$ corresponding to the characteristic timescale of the perturbations. Correlator 110*c* also determines the gradient integration time $\tau_\theta$ to set how often parameter are updated and determines the accuracy of the gradient approximation. Correlator 110*c* integrates the gradient approximation G for each time period $\tau_\theta$ and updater 112 updates the parameters according to a gradient descent step $\theta_i \rightarrow \theta_i - \eta G_i$. Updater 112 further determines a timescale $\tau_x$ for applying new training samples x, ŷ to neuromorphic hardware. After each $\tau_x$ period, updater 112 discards the old sample and applies new training samples x, ŷ to generate new output y and cost C. $\tau_\theta$ and $\tau_p$ have an impact on the training of the neural network implemented in a neuromorphic hardware in accordance with embodiments of the present invention and can be selected such that optimizer 110 can optimize using conventional numerical analysis techniques.

The perturbation signals $\tilde{\theta}(t)$ can take many forms, but it is preferred that they have a small-amplitude, zero-mean, and are orthogonal to each other. During a typical operation of embodiments in accordance with the present invention, $\tilde{\theta}(t)$ is temporarily added to the parameters θ as a means of estimating the gradient of the cost function. These perturbations are distinct from the gradient descent updates which are applied to the parameters so as to reduce the cost.

Figure 4:
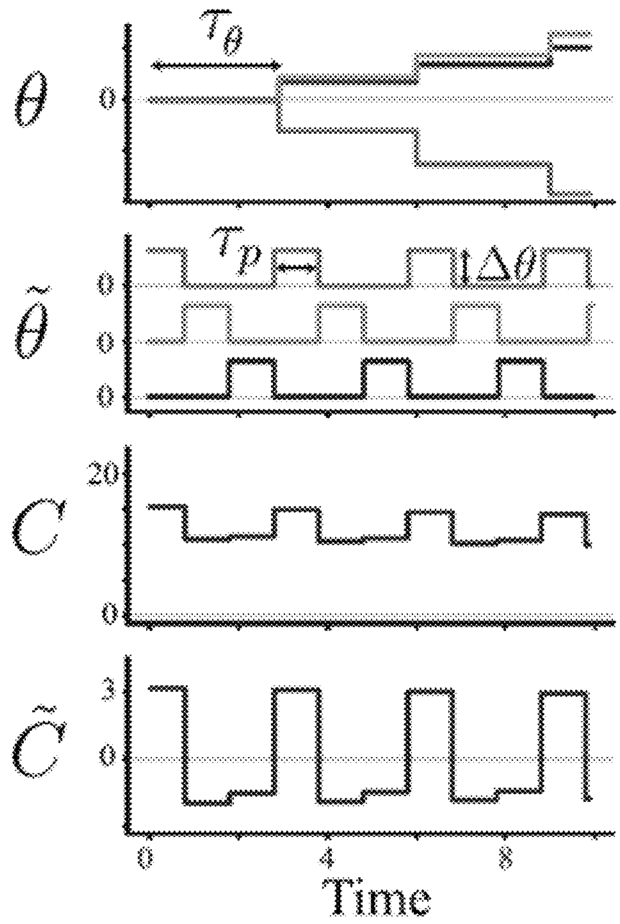
FIG. 4 illustrates a first exemplary optimization of a perturbed neural network in accordance with embodiments of the present invention.

FIG. 4 illustrates an exemplary optimization of a perturbed neural network implemented in a neuromorphic hardware in accordance with embodiments of the present invention. In an exemplary implementation of a forward finite-difference algorithm within embodiments in accordance with the present invention, as shown in FIG. 4, perturbator 110*a* applies discrete perturbation to parameters such that a single parameter is perturbed by Δθ at every $\tau_p$ and the parameters are perturbed sequentially. When parameter i is perturbed by $\Delta\theta_i$, the cost changes by ΔC and the resulting partial gradient $\Delta C/\Delta\theta_i \approx \partial C/\partial\theta_i$ is stored in $G_i$. If the time period $\tau_\theta$ for integration is set to $P\tau_p$, where P is the number of parameters in the network, then one element of gradient is approximated for each $\tau_p$, every partial gradient is measured and stored after $P\tau_p$, and the weight is updated after all the partial gradients are collected.

Figure 5:
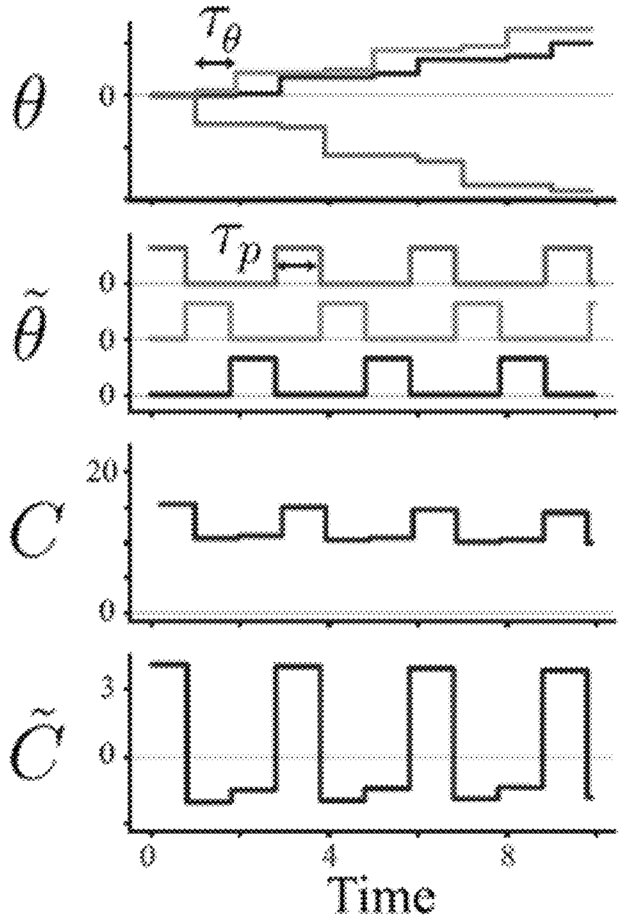
FIG. 5 illustrates a second exemplary optimization of a perturbed neural network in accordance with embodiments of the present invention.

FIG. 5 illustrates a second exemplary optimization of a perturbed neural network implemented in a neuromorphic hardware in accordance with embodiments of the present invention. Optimizer 110 uses the same process as described for the exemplary optimization shown in FIG. 4 but reduces the integration time $\tau_\theta$ to a single timestep $\tau_p$, i.e., $\tau_\theta = \tau_p$, corresponding to a coordinate descent, as shown in FIG. 5. In this case, rather than storing each $G_i$ until all the partial gradients are fully assembled, updater 112 applies the weight immediately after each $G_i$ is determined. In this exemplary optimization, $G_i$ is used for the weight update and subsequently discarded.

Figure 6:
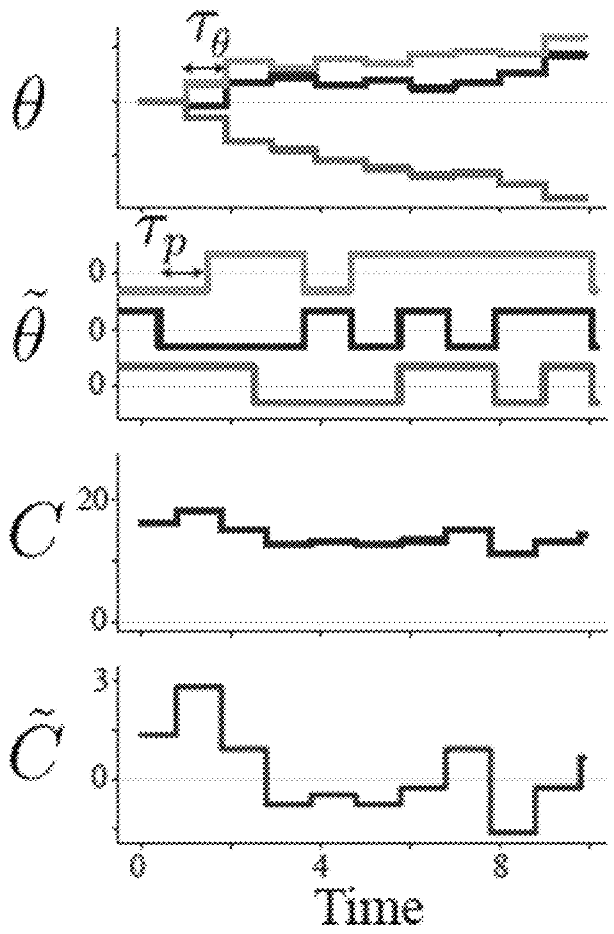
FIG. 6 illustrates a third exemplary optimization of a perturbed neural network in accordance with embodiments of the present invention.

FIG. 6 illustrates a third exemplary optimization of a perturbed neural network implemented in a neuromorphic hardware in accordance with embodiments of the present invention. Simultaneous perturbation stochastic approximation can be implemented by changing the values of the time constants and the form of the perturbation. Correlator 110*c* sets the integration time $\tau_\theta = \tau_p$ and perturbator 110*a* applies random, discrete $\{+\Delta\theta, -\Delta\theta\}$ perturbation to every parameter at every $\tau_p$, as shown in FIG. 6. $G_i$ values are not stored, and additional memories are not needed.

Figure 7:
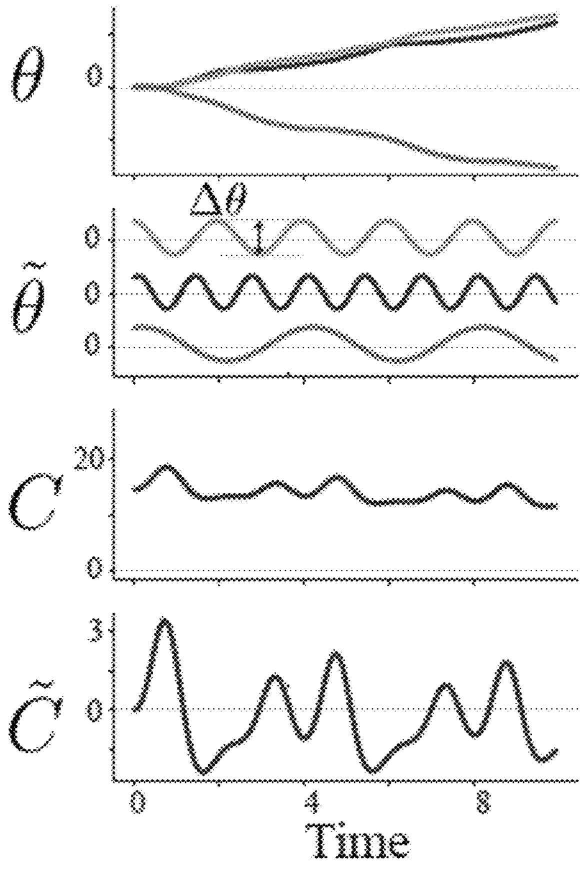
FIG. 7 illustrates a fourth exemplary optimization of a perturbed neural network in accordance with embodiments of the present invention.

FIG. 7 illustrates a fourth exemplary optimization of a perturbed neural network implemented in a neuromorphic hardware in accordance with embodiments of the present invention. In this case, $\tau_p$ corresponds to the timescale $1/\Delta f$, where $\Delta f$ is the perturbation bandwidth, the difference between the maximum and minimum perturbation frequency, $\tau_\theta$ is the integration constant, and there is no discrete update of parameters. $\theta_i$ is continuously updated with the output of filter 106 with time constant $\tau_\theta$.

Figure 8:
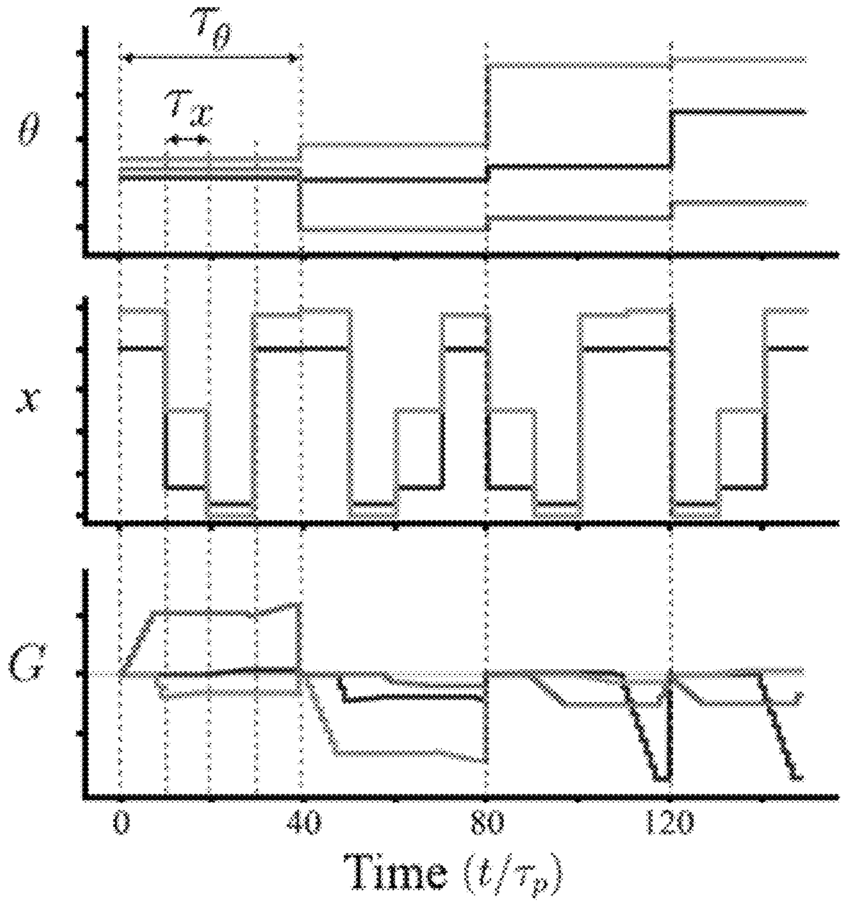
FIG. 8 illustrates an exemplary batching in a neural network in accordance with embodiments of the present invention.

Neuromorphic hardware may restrict machine learning datasets composed of large number of input samples, or training samples, from being presented to the hardware at a time. These datasets are typically broken into mini-batches and gradient descent is performed on these mini-batches. In embodiments in accordance with the present invention, updater 110 sets a time constant $\tau_x$ to define the time period for presenting new training samples x, ŷ to the hardware. As the sample changes, the integrated gradient approximation $G_i(t)$ will accumulate the error signal $e_i(t)$ from each sample it is presented. After time $\tau_\theta$, updater 110 updates the parameters $\theta_i$ with parameter changes determined using the accumulated gradient approximation $G_i(t)$. Optimizer 110 determines a batch size from a ratio of the gradient integration time $\tau_\theta$ and the sample update time $\tau_x$. When $\tau_x$ is shorter than $\tau_\theta$, optimizer 110 shows multiple samples to the network during a single gradient integration period. As the sample changes, the gradient approximation $G_i(t)$ will then include gradient information from each of those samples. FIG. 8 illustrates an exemplary batching with three parameters and two input training on a dataset with four samples using a PMGD system in accordance with embodiments of the present invention in a neural network in a neuromorphic hardware. The parameters θ are updated every $\tau_\theta$, and during that time, all four training samples are shown to the network and integrated into the gradient approximation G (batch size $\tau_\theta/\tau_x=4$). G accumulates at each timestep and is reset during the weight-update process after each $\tau_\theta$ period. FIG. 8 shows that updates to θ occur in the opposite direction of G.

Figure 9:
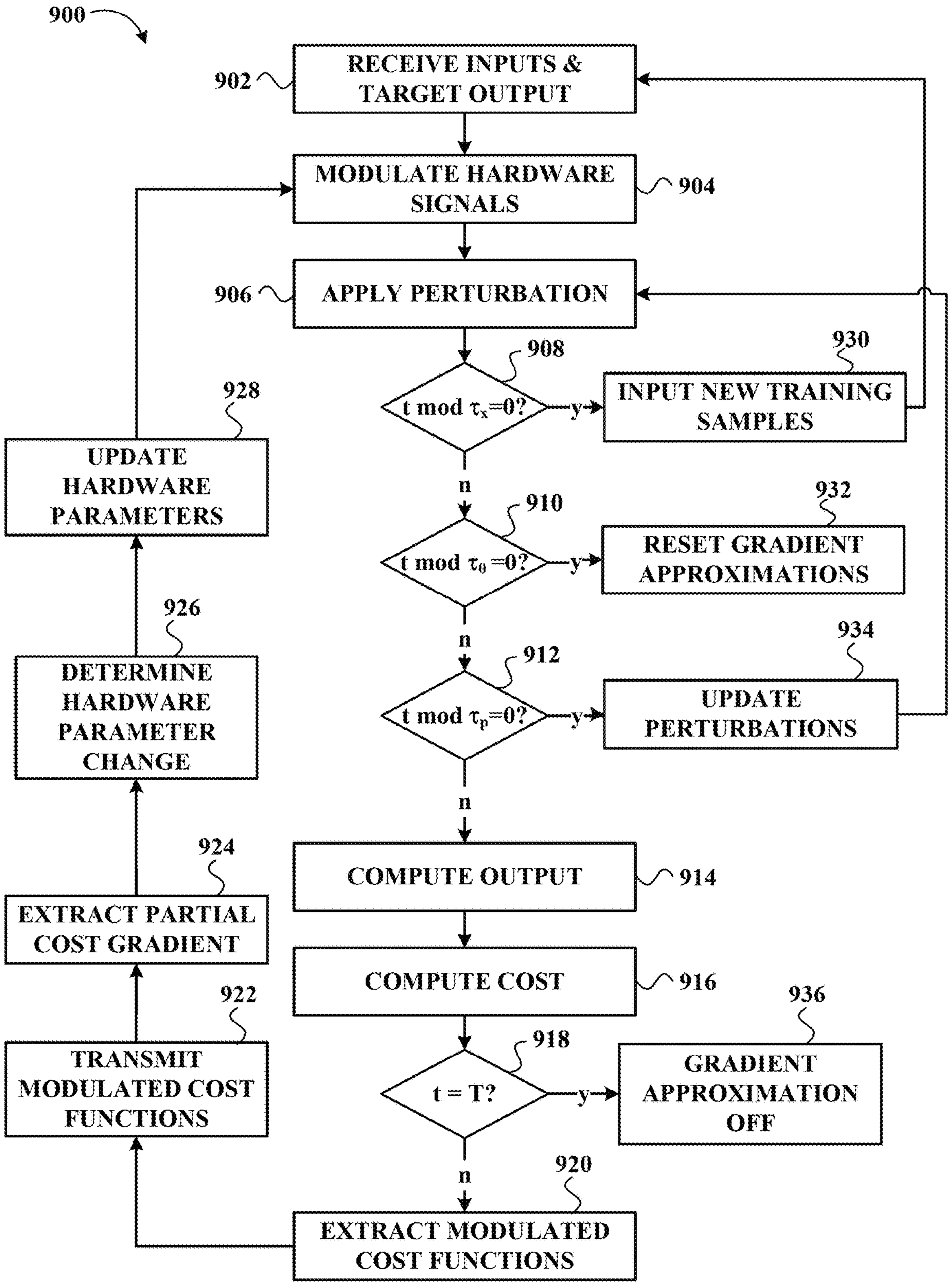
FIG. 9 is a flowchart illustrating a method for parameter multiplexed gradient descent in accordance with embodiments of the present invention for training a neural network in a neuromorphic hardware.

FIG. 9 is a flowchart illustrating a parameter multiplexed gradient descent (PMGD) method 900 in accordance with embodiments of the present invention for training a neural network in a neuromorphic hardware. An input layer of neurons receives time-varying inputs x(t) and target $y_{target}(t)$ at operational step 902. Neuromorphic hardware signals generated by hardware elements in synaptic circuits 102*b* are modulated, at operational step 904, to a value determined by hardware parameters θ. At operational step 906, perturbations are applied to hardware parameters θ by perturbator 110*a*. At decision step 908, PMGD method 900 determines whether the remainder of training time t divided by time period $\tau_x$ for presenting new training samples x, ŷ to the hardware (t mod $\tau_x$) is equal to zero. If the remainder of training time t divided by time period $\tau_x$ for presenting new training samples x, ŷ to the hardware (t mod $\tau_x$) is equal to zero, then new training samples are provided as inputs at step 930 and received at step 902. If the remainder of training time t divided by time period $\tau_x$ for presenting new training samples $x, y_{target}$ to the hardware (t mod $\tau_x$) is not equal to zero, then, at decision step 910, PMGD method 900 determines whether the remainder of training time divided by gradient integration time (t mod $\tau_\theta$) is equal to zero. If the remainder of training time divided by gradient integration time (t mod $\tau_\theta$) is equal to zero, then gradient approximations $G_i$ are reset at step 932. If the remainder of training time divided by gradient integration time (t mod $\tau_\theta$) is not equal to zero, then, at decision step 912, PMGD method 900 determines whether the remainder of training time divided by perturbations timescale (t mod $\tau_p$) is equal to zero. If the remainder of training time divided by perturbations timescale (t mod $\tau_p$) is equal to zero, then, at step 934, perturbations $\tilde{\theta}$ are updated by perturbator 110*a* and the updated perturbations are applied to hardware parameters θ at step 906. If the remainder of training time divided by perturbations timescale (t mod $\tau_p$) is not equal to zero, then, at step 914, output layer 102*d* of neurons determines output signals y(t) from the parameters θ and inputs x(t). A cost C is determined by cost estimator 104 from output signals y(t) and target $y_{target}$(t) at an operational step 916. At decisional step 918, PMGD method 900 determines whether the training time t is equal to a predetermined set time T. If PMGD method 900 determines that the training time t is equal to a predetermined set time T, then PMGD method 900 resets gradient approximations $G_i$ at step 936. If PMGD method 900 determines that the training time t is not equal to a predetermined set time T, then a change in cost $\tilde{C}$, or modulation, due to perturbations $\tilde{\theta}$ is extracted by filter 106 as modulated cost functions at operational step 920. The modulated cost functions extracted at step 920 are broadcasted or transmitted to all hardware parameters θ in synaptic circuits 102*b* at step 922. At operational step 924, correlator 110*c* extracts partial cost gradients and accumulates gradient approximations $G_i$. At operational step 926, a parameter change is determined by updater 110*d* for hardware parameters θ from the extracted partial cost gradient. The parameter change is further used by updater 112 to update the hardware parameters θ at step 928.

Figure 10:
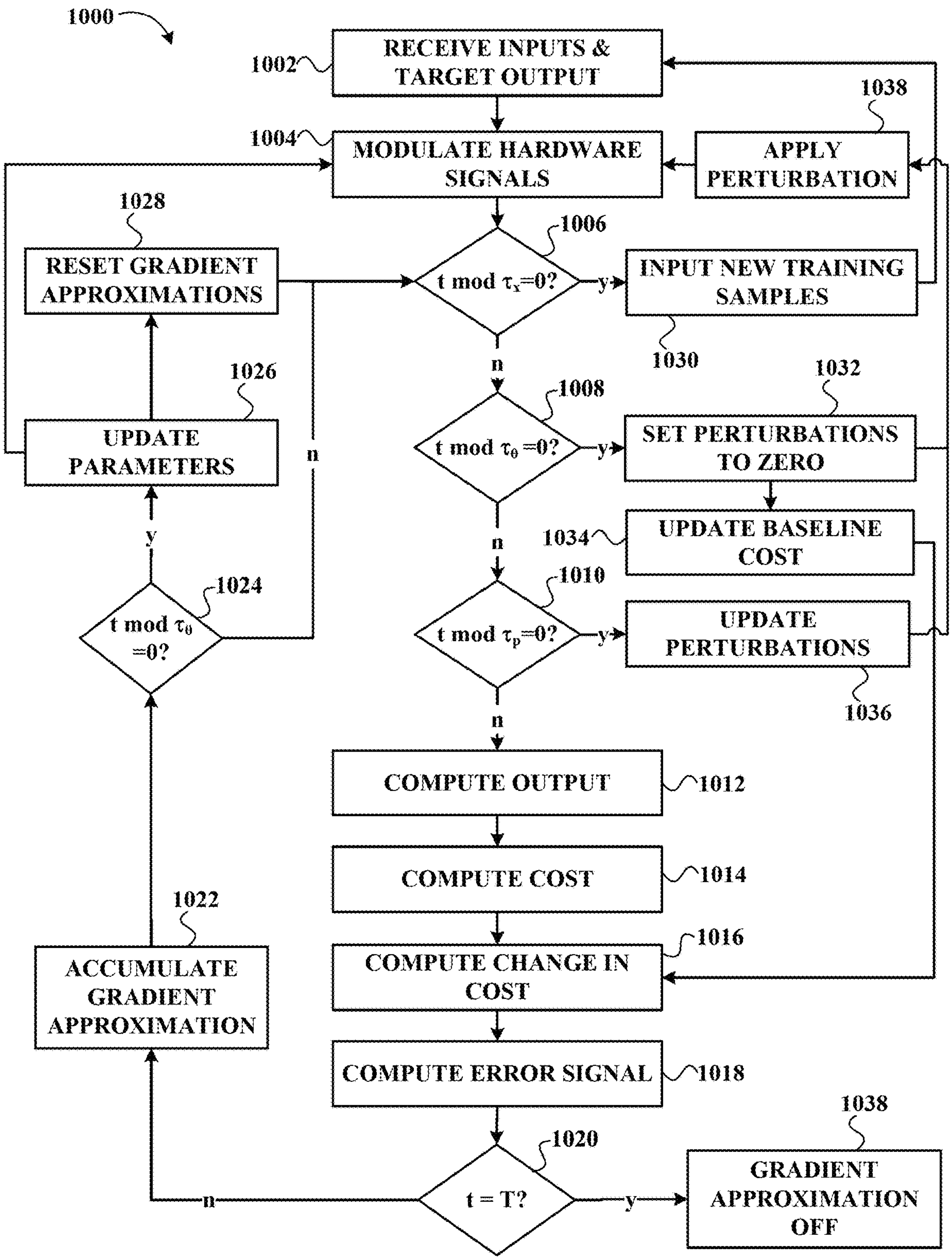
FIG. 10 is a flowchart illustrating an alternate method for parameter multiplexed gradient descent in accordance with embodiments of the present invention for training a neural network in a neuromorphic hardware.

FIG. 10 is an alternate flowchart illustrating a method for parameter multiplexed gradient descent (PMGD) 1000 in accordance with embodiments of the present invention for training a neural network in a neuromorphic hardware with discrete perturbations. An input layer of neurons receives time-varying inputs x(t) and target $y_{target}$(t) at operational step 1002. Hardware parameters θ applied by synapses to each of the inputs x(t) and transmitted to a subsequent layer of neurons are initialized at operational step 1004. In one embodiment, initializing of hardware parameters θ include modulation of neuromorphic hardware signals generated by hardware elements in synaptic circuits 102*b* to a predetermined value set by hardware parameters θ. At decision step 1006, PMGD method 1000 determines whether the remainder of training time t divided by time period $\tau_x$ for presenting new training samples x, ŷ to the hardware (t mod $\tau_x$) is equal to zero. If the remainder of training time t divided by time period $\tau_x$ for presenting new training samples x, ŷ to the hardware (t mod $\tau_x$) is equal to zero, then, at step 1030, new training samples are provided as inputs and received at step 1002. If the remainder of training time t divided by time period $\tau_x$ for presenting new training samples x, $y_{target}$ to the hardware (t mod $\tau_x$) is not equal to zero, then, at decision step 1008, PMGD method 1000 determines whether the remainder of training time divided by gradient integration time (t mod $\tau_\theta$) is equal to zero. If the remainder of training time divided by gradient integration time (t mod $\tau_\theta$) is equal to zero, then, at step 1032, perturbations $\tilde{\theta}$ are set to zero and baseline cost $C_0$ is updated at step 1034. If the remainder of training time divided by gradient integration time (t mod $\tau_\theta$) is not equal to zero, then, at decision step 1010, PMGD method 1000 determines whether the remainder of training time divided by perturbations timescale (t mod $\tau_p$) is equal to zero. If the remainder of training time divided by perturbations timescale (t mod $\tau_p$) is equal to zero, then perturbations $\tilde{\theta}$ are updated at step 1036 and the updated perturbations are applied to hardware parameters θ at step 1038. If the remainder of training time divided by perturbations timescale (t mod $\tau_p$) is not equal to zero, then, at step 1012, output layer 102*d* of neurons determines output signals y(t) from the parameters θ and inputs x(t). A cost C is determined from output y(t) and target $y_{target}$(t) at an operational step 1014, and a change in cost $\tilde{C}$, or modulation, due to perturbations $\tilde{\theta}$ is computed at operational step 1016. At operational step 1018, an error signal $e_i$ is determined by integrating a product of perturbation θ and modulation $\tilde{C}$. At decision step 1020, PMGD method 1000 determines whether the training time is equal to a predetermined time T. If the training time is not equal to the predetermined time T, then, at step 1022, PMGD method 1000 determines and accumulates gradient approximations $G_i$. If the training time is equal to the predetermined time T, then, at step 1038, PMGD method 1000 stops the accumulation of gradient approximations $G_i$. At decision step 1024, PMGD method 1000 again determines whether the remainder of training time divided by gradient integration time (t mod $\tau_\theta$) is equal to zero. If the remainder of training time divided by gradient integration time (t mod $\tau_\theta$) is equal to zero, then PMGD method 1000 updates hardware parameters θ at step 1026 and resets gradient approximations $G_i$ at step 1028. If the remainder of training time divided by gradient integration time (t mod $\tau_\theta$) gradient integration time $\tau_\theta$ is not equal to zero, then, at decision step 1006, PMGD method 1000 determines whether the remainder of training time t divided by time period $\tau_x$ for presenting new training samples x,$y_{target}$ to the hardware (t mod $\tau_x$) is equal to zero.

Figure 11:
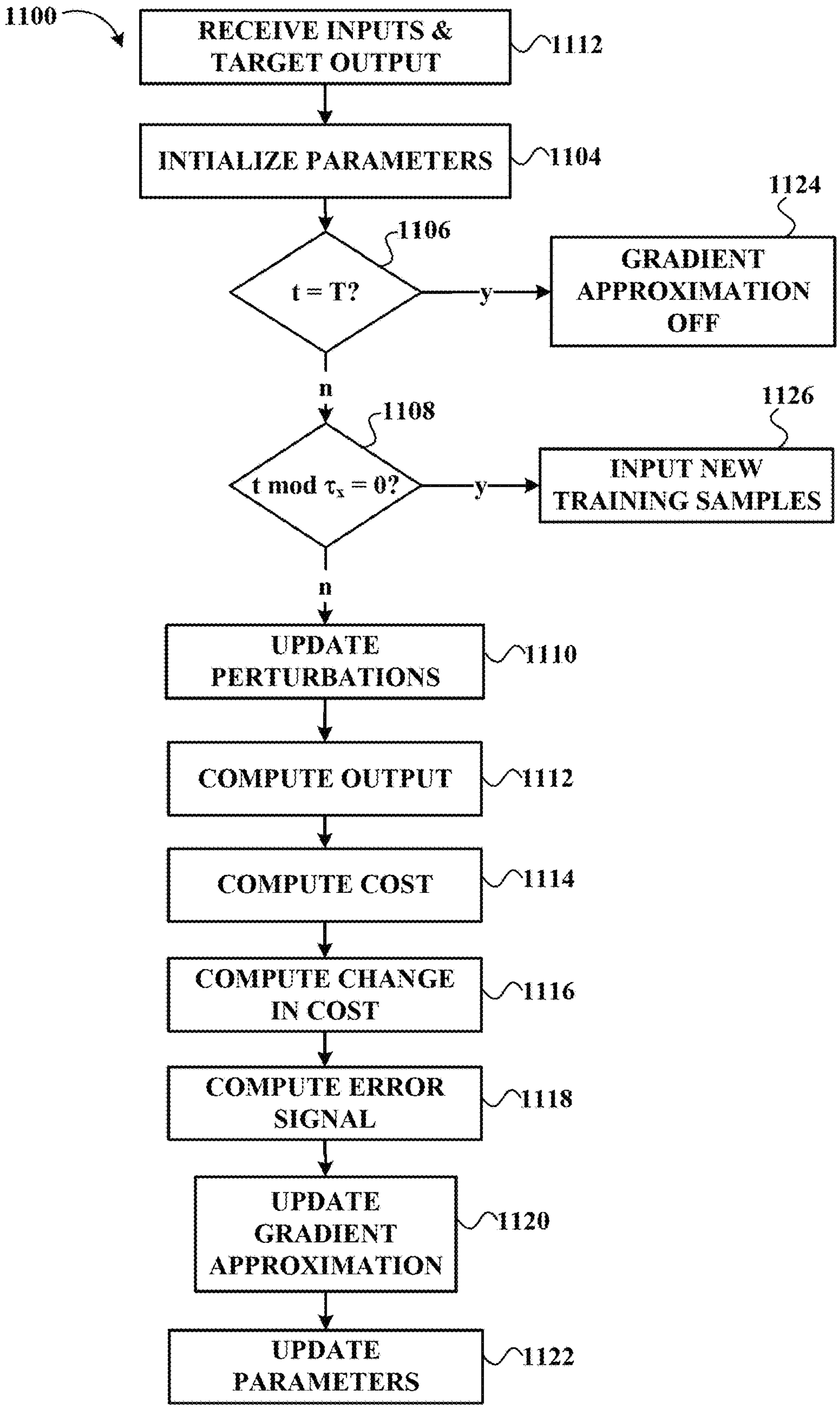
FIG. 11 is a flowchart illustrating an alternate method for parameter multiplexed gradient descent in accordance with embodiments of the present invention for training a neural network in a neuromorphic hardware.

FIG. 11 is a flowchart illustrating an alternate method for parameter multiplexed gradient descent (PMGD) 1100 in accordance with embodiments of the present invention for training a neural network in a neuromorphic hardware with analog perturbations. An input layer of neurons receives time-varying inputs x(t) and target $y_{target}$(t) at operational step 1102. Hardware parameters θ applied by synapses to each of the inputs x(t) and transmitted to a subsequent layer of neurons are initialized at operational step 1104. In one embodiment, initializing of hardware parameters θ include modulation of neuromorphic hardware signals generated by hardware elements in synaptic circuits 102*b* to a predetermined value set by hardware parameters θ. At decision step 1106, PMGD method 1100 determines whether the training time t is equal to a predetermined time T. If the training time t is equal to the predetermined time T, then accumulation of gradient approximations $G_i$ is turned off at step 1124. If the training time t is not equal to a predetermined time T, then, at decision step 1108, PMGD method 1100 determines whether the remainder of training time t divided by time period $\tau_x$ for presenting new training samples x,$y_{target}$ to the hardware (t mod $\tau_x$) is equal to zero. If the remainder of training time t divided by time period $\tau_x$ for presenting new training samples x,$y_{target}$ to the hardware (t mod $\tau_x$) is equal to zero, then, at step 1126, new training samples are provided as inputs. If the remainder of training time t divided by time period $\tau_x$ for presenting new training samples x,$y_{target}$ to the hardware (t mod $\tau_x$) is not equal to zero, then PMGD method 1100 updates perturbations $\tilde{\theta}$ at step 1110, and, at operational step 1112, output layer 102*d* of neurons determines an output y(t) from the parameters θ and inputs x(t). A cost C is determined from output y(t) and target $y_{target}(t)$ at an operational step 1114, and a change in cost $\tilde{C}$, or modulation, due to perturbations $\tilde{\theta}$ is computed at operational step 1116. At operational step 1118, an error signal $e_i$ is determined by integrating a product of perturbation θ and modulation $\tilde{C}$. PMGD method 1100 updates gradient approximations $G_i$ at operational step 1120, and updates hardware parameters θ at operational step 1122.

Reference to the specific examples which follow and included herein are intended to provide a clearer understanding of systems and methods in accordance with embodiments of the present invention. The examples should not be construed as a limitation upon the scope of the present invention.

Example. Simulation of Parameter Multiplexed Gradient Descent (PMGD)

Simulations were performed on modern machine learning datasets to characterize the utility of a PMGD method in accordance with embodiments of the present invention. A goal of the simulation was not to perform gradient descent as fast as possible on a CPU or GPU, but rather to emulate hardware implementing PMGD and evaluate its potential performance in a hardware context. In particular, the simulation estimated the speed, accuracy, and resilience to noise and fabrication imperfections. The simulator was written in the Julia language and can be run on a CPU or GPU. Algorithms used in the simulation are provided in Table 1 and Table 2. The parameters and variables used in the simulations are provided in Table 3.

TABLE 1

| Algorithm 1 Discrete algorithm |
|---|
| Initialize parameters θ |
| for n in num iterations do |
| if (n mod $\tau_x = 0$) then |
| Input new training sample x, $y_{target}$ |
| if (n mod $\tau_x = 0$) or (n mod $\tau_\theta = 0$) then |
| Set perturbations to zero $\tilde{\theta} \leftarrow 0$ |
| Update baseline cost $C_0 \leftarrow C(f(x;\theta), y_{target})$ |
| if (n mod $\tau_p = 0$) then |
| Update perturbations $\tilde{\theta}$ |
| Compute output $y \leftarrow f(x; \theta + \tilde{\theta})$ |
| Compute cost $C \leftarrow C(y, y_{target})$ |
| Compute change in cost $\tilde{C} \leftarrow C - C_0$ |
| Compute instantaneous error signal $e \leftarrow \tilde{C}\tilde{\theta}/\Delta\theta^2$ |
| Accumulate gradient approximation $G \leftarrow G + e$ |
| if (n mod $\tau_\theta = 0$) then |
| Update parameters $\theta \leftarrow \theta - \eta G$ |
| Reset gradient approximation $G \leftarrow 0$ |

TABLE 2

| Algorithm 2 Analog algorithm |
|---|
| Initialize parameters θ |
| for t = 0 to T step dt do |
| if (t mod $\tau_x = 0$) then |
| Input new training sample x, $y_{target}$ |
| Update perturbations $\tilde{\theta}$ |
| Compute output $y \leftarrow f(x; \theta + \tilde{\theta})$ |
| Compute cost $C(t) \leftarrow C(y, y_{target})$ |
| Compute discretized highpass $\tilde{C}(t) \leftarrow \frac{\tau_{hp}}{\tau_{hp} + dt}\left(\tilde{C}(t-dt) + C(t) - C(t) - C(t-dt)\right)$ |

TABLE 2-continued

| Algorithm 2 Analog algorithm |
|---|
| Compute instantaneous error signal $e(t) \leftarrow \tilde{C}\tilde{\theta}dt/\Delta\theta^2$ |
| Update gradient approximation $G(t) \leftarrow \frac{dt}{\tau_\theta + dt}\left(e(t) + \frac{\tau_\theta}{dt}G(t-dt)\right)$ |
| Update parameters $\theta \leftarrow \theta - \eta G$ |

TABLE 3

| Description | Symbol | Analog or Digital |
|---|---|---|
| Change in the cost due to perturbation | $\tilde{C}$ | both |
| Perturbation to parameters | $\tilde{\theta}$ | both |
| Parameters | θ | both |
| Input sample | x | both |
| Target output | ŷ | both |
| Network output | y | both |
| Cost | C | both |
| Unperturbed baseline cost | $C_0$ | digital |
| Gradient approximation | G | both |
| Instantaneous error signal | e | both |
| Learning rate | η | both |
| Perturbation amplitude | Δθ | both |
| Input-sample change time constant | $\tau_x$ | both |
| Parameter update time constant | $\tau_\theta$ | both |
| Perturbation time constant | $\tau_p$ | digital |
| Highpass filter time constant | $\tau_{hp}$ | analog |

Equivalence to Backpropagation

A 2-bit parity problem was solved by training a 2-2-1 feedforward network with 9 parameters (6 weights, 3 biases) to verify whether the simulation is capable of minimizing the cost for a sample problem, and that it is equivalent to gradient descent via backpropagation with appropriate parameter choices. The simulation was performed using a large value for $\tau_\theta$ and $\tau_\theta=\tau_x$ such that a good approximation of the gradient in G for each training sample is achieved. The simulation was repeated using $\tau_\theta=1$ such that the gradient approximation G for each sample was relatively poor. FIG. 12 illustrates exemplary measurement data for the number of epochs and the amount of time (number of iterations of the simulation) for the two experiments.

Figure 12A:
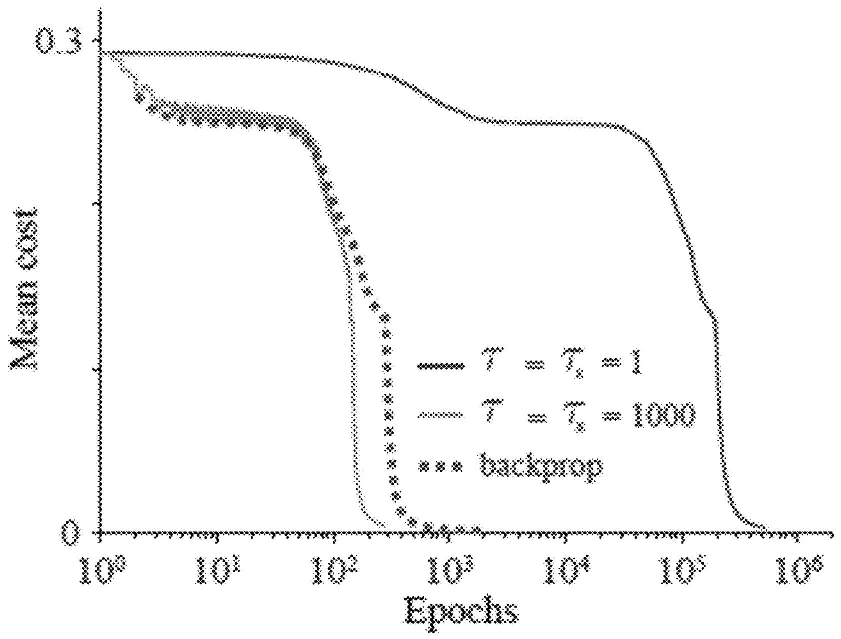
FIGS. 12A-B illustrate plots of data obtained using simulations of an exemplary 2-bit problem by training a 2-2-1 feedforward network with 9 parameters using a method in accordance with embodiments of the present invention.
Figure 12B:
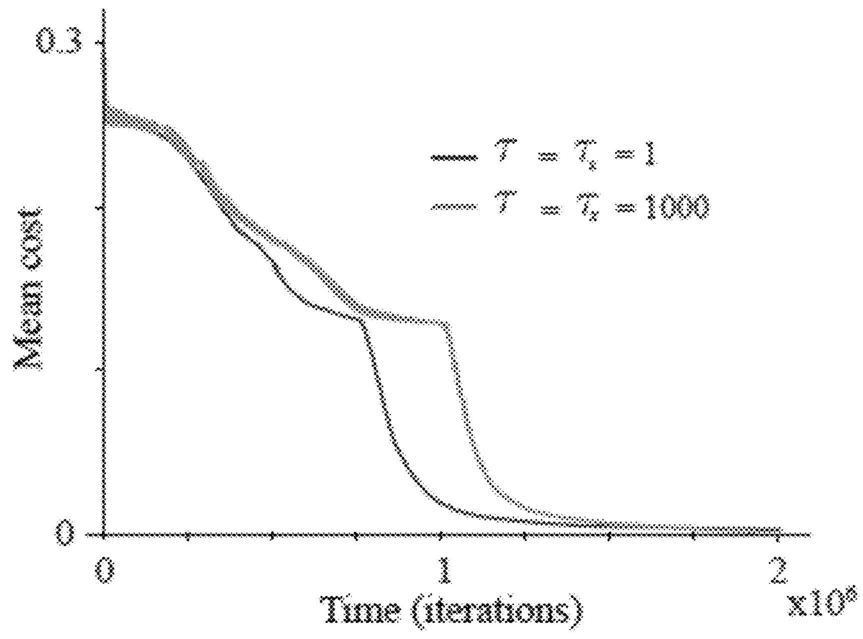

A comparison of the plots in FIG. 12A show that, at $\tau_\theta=\tau_x=1000$, the system in accordance with an embodiment of the present invention follows a training trajectory that is nearly identical to the trajectory for backpropagation. For each sample shown to the network, the gradient approximation G has 1000 timesteps to integrate an accurate estimate that should be very close to the true gradient computed by backpropagation. When $\tau_0=\tau_x=1$, however, each sample only has a single timestep to estimate the gradient before moving on to the next sample. As a result, the samples must be shown to the network a greater number of times to minimize the cost, resulting in a much larger number of epochs. However, while the $\tau_\theta=\theta_x=1$ case uses the sample data less efficiently (requiring more epochs), there is a tradeoff for data efficiency and run time. A plot of the cost versus iterations, as shown in FIG. 12B, provides an estimate of how long it will take hardware to train in terms of real time. As shown in FIG. 12B, shorter $\tau_\theta$ and $\tau_x$ values take about half the time to minimize the cost as the longer values. These examples serve to highlight that while longer integration times produce a more accurate gradient approximation, integration times as short as $\tau_p$ may also be used to train a network.

Figure 13:
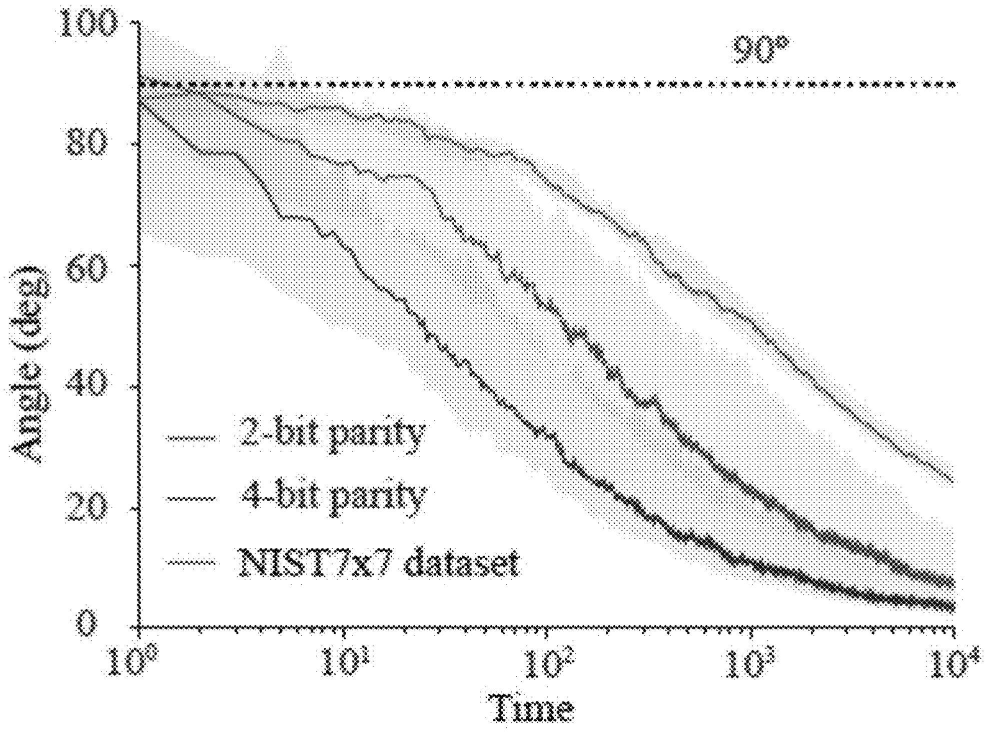
FIG. 13 illustrates plots of angle between gradient approximation G and the true gradient versus time.

To quantify the effect of longer integration times on the accuracy of the gradient approximation, convergence of the gradient approximation G to the true gradient $\partial C/\partial\theta$ (as computed by backpropagation) was measured as a function of time by simulating with $\tau_\theta=\infty$ and $\tau_x=\tau_p=1$, such that G is continuously integrated without resetting or updating the parameters. The angle between the true gradient $\partial C/\partial\theta$ and the approximation G were also computed during the simulation. FIG. 13 shows plots of angle between gradient approximation G and the true gradient versus time obtained from simulations of 2-bit parity, 4-bit parity, and NIST7×7 problems. The NIST7×7 dataset is a small image recognition problem based on identifying the letters N, I, S, and T on a 7×7-pixel plane. The dataset has the property that it cannot be solved to greater than 93% with a linear solve. The solution accuracy for a 49-4-4 feedforward network with sigmoidal activation functions often exceeds 95% (see Table 5). FIG. 13 confirms that the angle decreases with time as G aligns with the true gradient. The time axis is in units of $\tau_p$, which is the minimum discrete timestep in this system. For a real hardware platform, this timestep is approximately the inference time of the system. In general, the more parameters the network has, the longer it takes to converge to the true gradient.

Mini-Batching

Figure 14A:
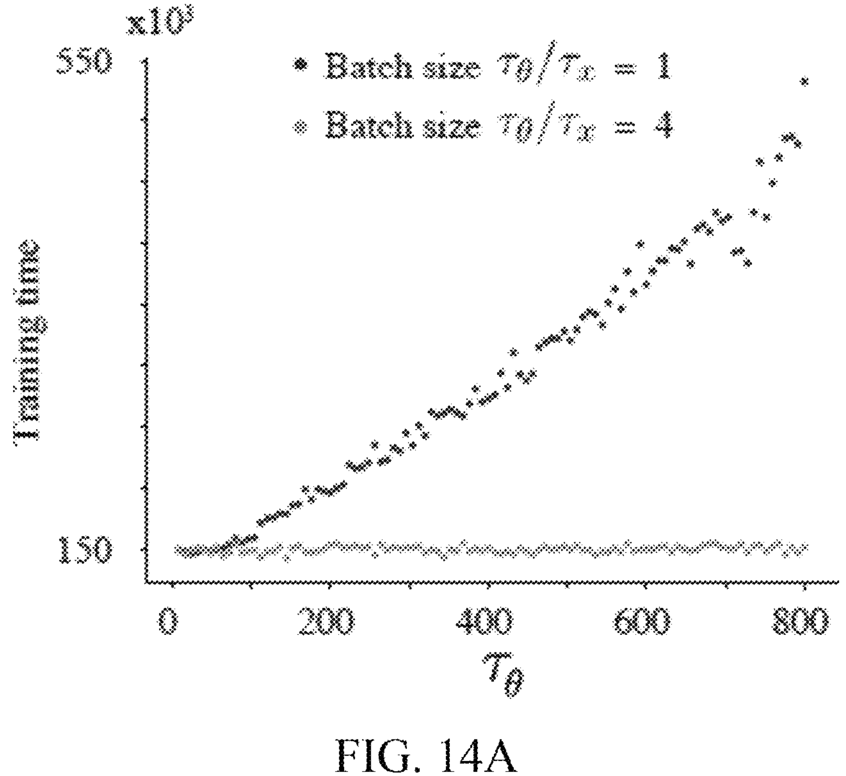
FIGS. 14A-B illustrate plots showing the effects for $\tau_\theta$ on the training of an exemplary 2-bit parity (XOR) problem.

Investigations of the effects of $\tau_\theta$ and $\tau_x$ on training time show that longer $\tau_\theta$ values result in a more accurate gradient approximation but reduce the frequency of parameter updates. Using a fixed, low $\eta$ value, a 2-2-1 network was trained to solve 2-bit parity (XOR) for 100 different random parameter initializations, varying $\tau_\theta$ but keeping the batch size $\tau_\theta/\tau_x$ constant at either 4 or 1. Since the 2-bit parity dataset is composed of four (x, $y_{target}$) pairs, $\tau_x=4\tau_\theta$ is analogous to gradient descent—all four samples are integrated into the gradient approximation G before performing a weight update. When $\tau_x=\tau_\theta$, the network performs stochastic gradient descent (SGD) with a batch size of 1. FIG. 14A shows the training time as a function of $\tau_\theta$ and batch size. Here, training time corresponds to the time at which the total cost C drops below 0.04, indicating the problem was solved successfully. In the case where the batch size was 1, increasing $\tau_\theta$ increased the training time. However, when the batch size was 4, increasing $\tau_\theta$ had little effect on the training time.

Figure 14B:
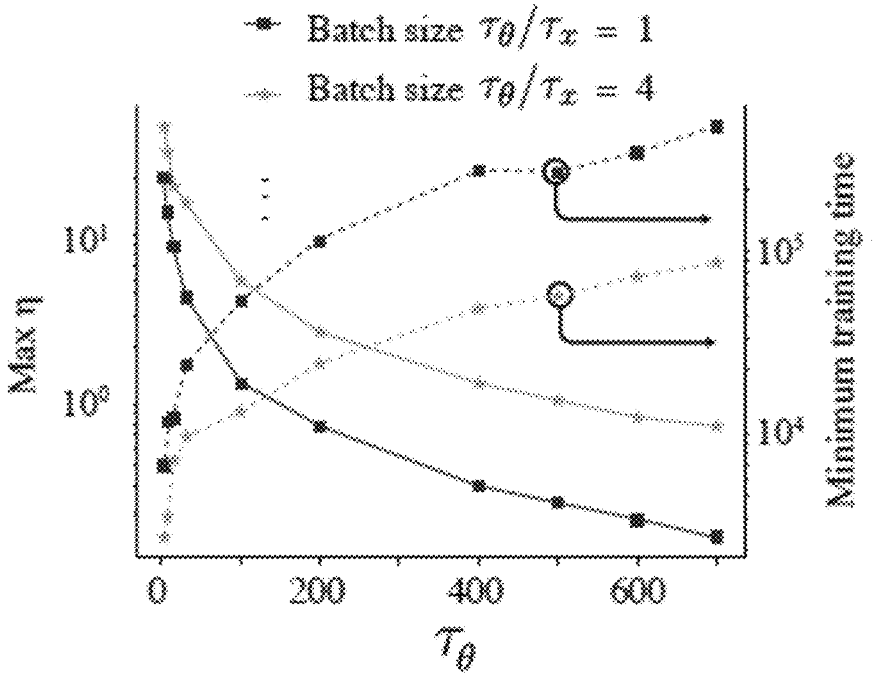

As with any training process, the training can become unstable at higher $\eta$ values and fail to solve the task. The results shown in FIG. 14A are only for a fixed learning rate, and so, the effect of $\tau_\theta$ on the maximum achievable $\eta$ were also examined. As shown in FIG. 14B, as $\tau_\theta$ is increased the max $\eta$ decreases, resulting in longer minimum training times. Here, "max $\eta$" is the maximum learning rate where the network successfully solved the 2-bit parity problem for at least 50 out of 100 random initializations.

From these results, it can be inferred that a poor gradient approximation taken with respect to all training examples is more useful than collecting an accurate gradient with respect to a single example. Waiting a long time for an extremely accurate gradient and then taking a large step is less productive than taking a series of short (but less accurate) steps. Accordingly, implementing an effective gradient descent process in PMGD does not necessarily require additional memory to store accurate, high-bit-depth gradient values. In the exemplary implementation described herein, G accumulates with time and so the size of the parameter update $\eta G$ from $\theta_i \rightarrow \theta_i - \eta G_i$ grows proportionally to the integration time. Accordingly, when $\tau_\theta$ is larger the effective step in the direction of the gradient is also larger, and so for fixed $\eta$ the rate of training therefore remains approximately constant. If this was not the case, whenever $\tau_\theta$ is doubled, $\eta$ would also need to reduce by half to maintain the same approximate rate of training.

Analog and Digital Perturbations

The parameter perturbations can take many different forms, provided they are low-amplitude, and their time averages are pairwise orthogonal or, in a statistical setting, are uncorrelated. Four types of perturbations were implemented in systems and methods in accordance with embodiments of the present invention: sinusoidal perturbations, sequential discrete perturbations, discrete code perturbations, and random code perturbations. In sinusoidal perturbations, each parameter is assigned a unique frequency. In sequential discrete perturbations, parameters are sequentially perturbed, one at a time, by $+\Delta\theta$. "Code" perturbations are simultaneous discrete perturbations of $\{-\Delta\theta, +\Delta\theta\}$ for every parameter every $\tau_p$ timesteps. There are two types of code-perturbations: the first type consists of a predefined set of pairwise-orthogonal square wave functions that take the values of $\{-\Delta\theta, +\Delta\theta\}$. Each of these perturbation patterns is a deterministic sequence, and no two parameters have the same sequence. The second type includes randomly generated sequences of $\{-\Delta\theta, +\Delta\theta\}$ that are pairwise uncorrelated and are referred to as "statistically orthogonal." The statistically orthogonal code-perturbations are less efficient than the deterministic orthogonal codes because perturbations from multiple parameters interfere with each other more in $\tilde{C}$—any finite sample of the perturbations will have a non-zero correlation that decreases to zero as the sample size increases. However, the use of the statistically orthogonal version allows the perturbations to be generated locally and randomly. These perturbations may be useful in hardware implementations, as they are spread-spectrum and single-frequency noise from external sources is unlikely to corrupt the feedback signals. To compare the training performance between different perturbation types, four different perturbation types were applied to the 2-2-1 network to solve the 2-bit parity problem or to show that training can happen in both a purely analog and purely digital way.

Figure 15:
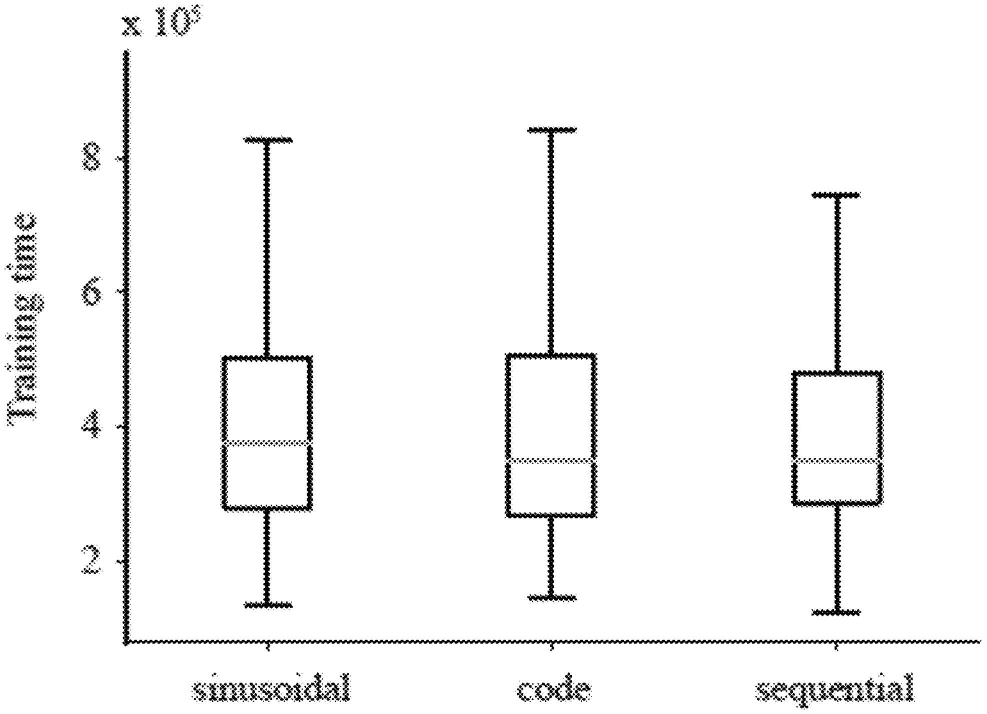
FIG. 15 illustrates training time distributions for the 2-bit parity problem using the different perturbation types.

FIG. 15 shows the training time distributions for the 2-bit parity problem using the different perturbation types by measuring their time to train a 2-2-1 network on the 2-bit parity (XOR) problem. The bandwidth for sinusoidal perturbations was set to be $\frac{1}{2}\tau_p$. The different perturbation types were found to be approximately equivalent in terms of speed of training. This equivalence makes sense when one considers that the feedback from $\tilde{C}$ has a finite bandwidth that must be shared between all the parameters—no matter the encoding (perturbation) scheme, the information carried in that feedback to the parameters will be limited by that finite bandwidth.

Operation on Noisy or Imperfect Hardware

The fabrication defects and signal noise present in emerging hardware platforms can pose challenges for current training techniques in hardware. The effects of the following three different types of imperfections and noise that could affect hardware systems were investigated: (1) stochastic noise on the output cost $C_{noise}$, (2) stochastic noise on the parameter update $\theta_{noise}$, (3) per-neuron defects in the activation function, where each neuron has a randomly scaled and offset sigmoidal activation function that is static in time. These tests were performed on the NIST7×7 dataset using the 49-4-4 network with 220 parameters and with $\tau_x=\tau_\theta=1$.

In the first test, Gaussian noise with mean zero and standard deviation $\sigma_C$ were added to the cost, applied every timestep such that noise $C(t)=C_{ideal}(t)+C_{noise}(t;\ \sigma_C)$. FIG.

Figure 16A:
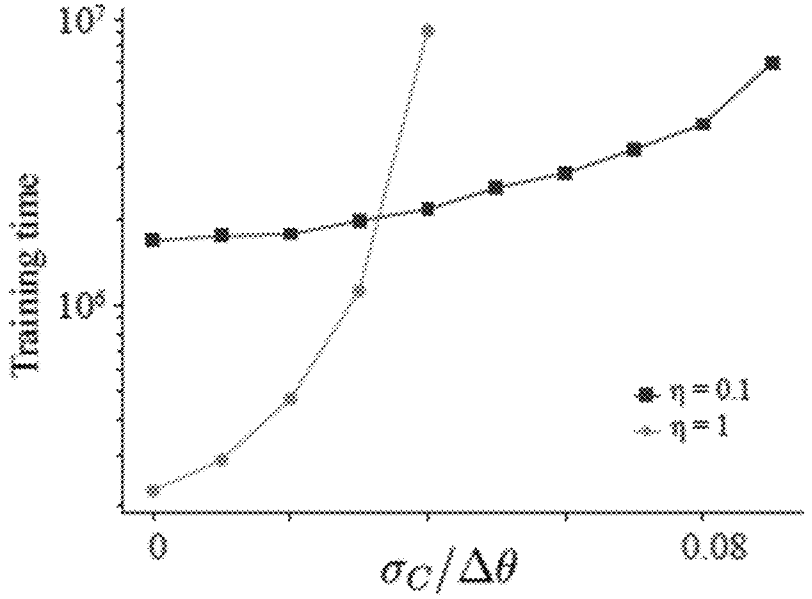
FIGS. 16A-B illustrate the effect increasing a c on the training time for different learning rates.
Figure 16B:
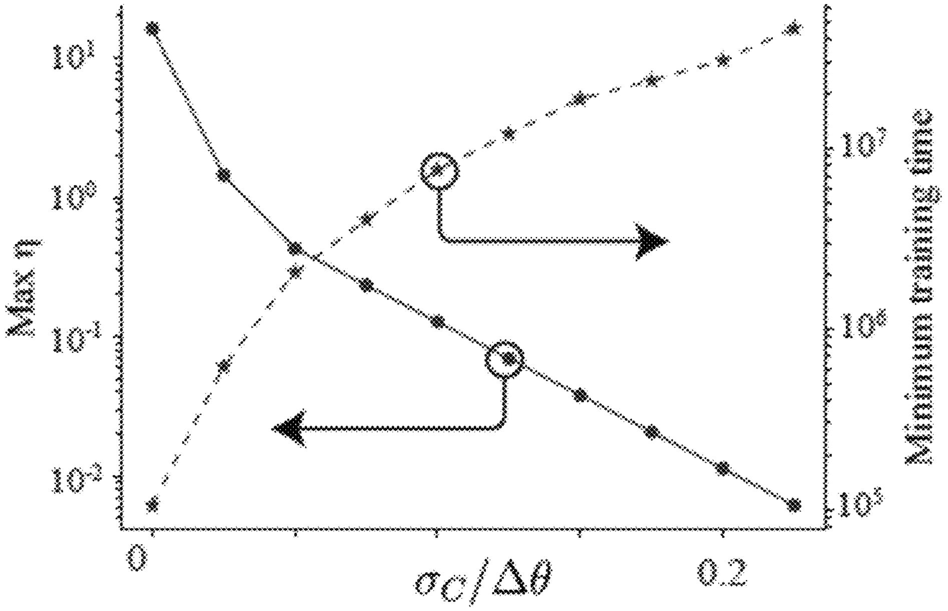

16A shows the effect of increasing $\sigma_C$ on the training time for different learning rates. For a given learning rate, there is a threshold amount of noise below which the training time is minimally changed. However, as cost noise increases, the training time eventually increases and ultimately stops converging. To determine how this noise would affect the minimum training time for optimized learning rates, the maximum achievable $\eta$ value for a range of $\sigma_C$ was also measured. FIG. 16B shows this maximum $\eta$ value versus cost noise, and corresponding minimum training time. The trend indicates that, $\eta$ can be higher at lower cost noise $\sigma_C$ and a faster training is possible by reducing the learning rate.

In the next test, the effect of noisy parameter updates on the training process was analyzed. For this experiment, any updates to parameter included a randomly-applied deviation such that $\theta \leftarrow \theta - \eta G + \theta_{noise}$, where $\theta_{noise}$ is Gaussian with mean zero and standard deviation $\sigma_\theta$, normalized by $\Delta\theta$, such that $\theta_{noise} \sim N(0, \sigma_\theta/\Delta\theta)$.

Figure 17A:
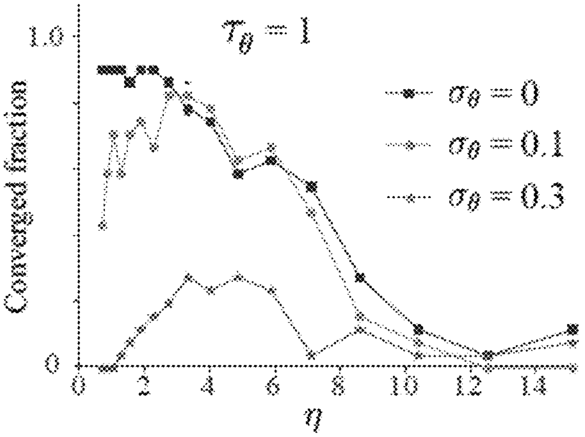
FIGS. 17A-D illustrate the effect of noisy (stochastic) parameter updates on solving XOR in a 2-2-1 feedforward network, measured for various noise amplitudes $\sigma_\theta$.
Figure 17B:
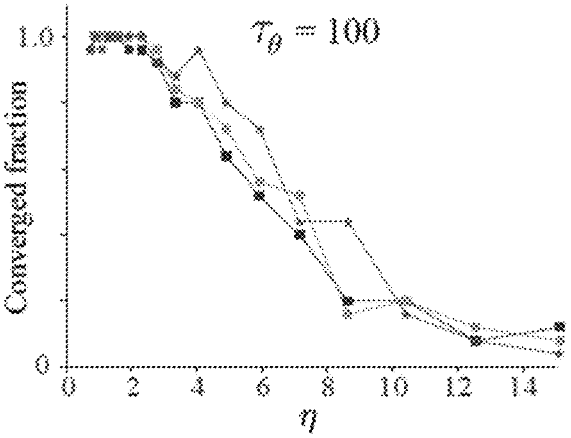
Figure 17C:
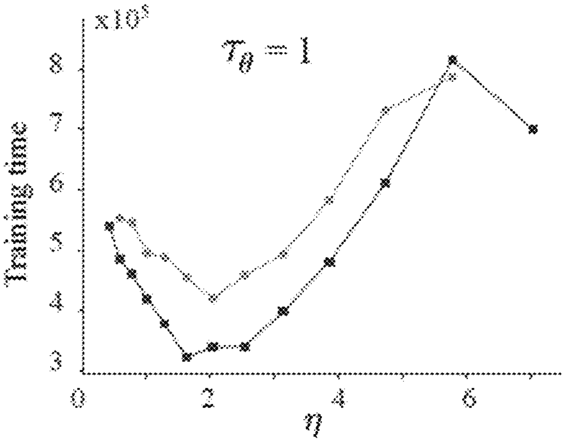

It was discovered that larger values of a $\sigma_\theta$ can prevent convergence entirely (FIG. 17A). In the presence of this noise, increasing $\eta$ can improve the convergence of the problem, as highlighted by the a $\sigma_\theta=0.1$ and $\sigma_\theta=0.3$ lines in FIG. 17A. At very small $\eta$ values, it is likely that $\theta_{noise}$ will overwhelm the very small $\eta G$ in $\theta \leftarrow \theta - \eta G + \theta_{noise}$. Making $\eta$ larger could prevent $\eta G$ from being drowned out by $\theta_{noise}$. At very large $\eta$ values, the usual gradient-descent instability starts to dominate and the convergence approaches zero. For a given $\eta$, small values of $\sigma_\theta$ marginally increase the training time, but the effect is less significant than changing the learning rate 77 (FIG. 17C).

Figure 17D:
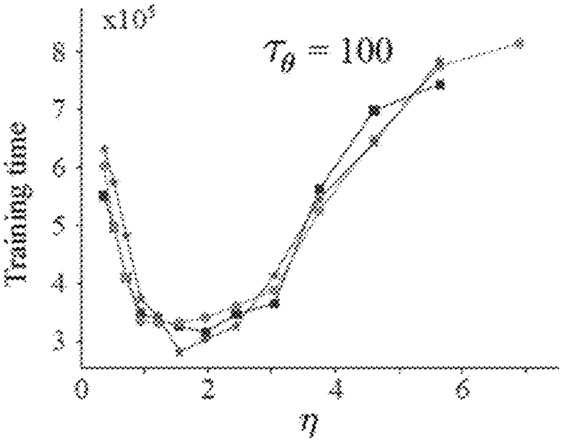

Another method to reduce the impact of $\theta_{noise}$ is to increase the integration time of the gradient. When $\tau_\theta$ is increased, G is accumulated for a longer time and becomes proportionally larger. FIGS. 17B and 17D show that even the largest $\sigma_\theta$ value has little effect on the result.

In the fourth test, the effect of including "defects" in the neuronal activation functions was analyzed. Here, neuronal activation functions were no longer identical sigmoid functions, but had fixed random offsets and scaling that were static in time. These variations emulate device-to-device variations that may be found in hardware, for instance in analog VLSI neurons. The sigmoid activation function for each neuron k was modified to a general logistic function $f_k(a)=\alpha_k(1-e^{-\beta_k(a-a_k)})^{-1}+b_k$. The variations were all Gaussian, and the scaling factors $\alpha_k$ and $\beta_k$ had a standard deviation $\sigma_a$ and a mean of 1, while the offset factors $\alpha_k$ and $\beta_k$ also had a standard deviation of $\sigma_a$ but were mean-zero.

Figure 18A:
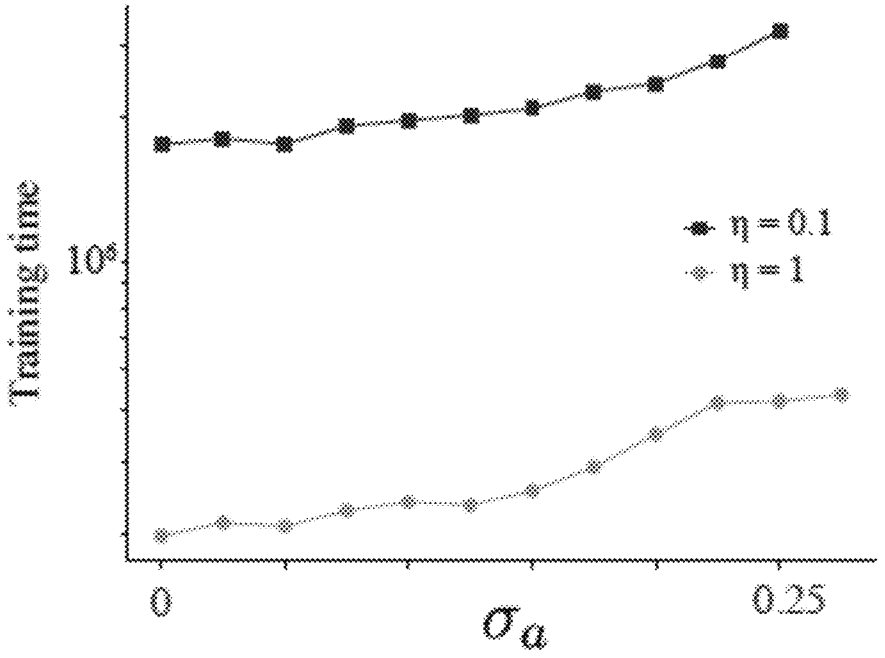
FIGS. 18A-B illustrate the effect of adding random offsets and scaling to each neuron's sigmoid activation function.
Figure 18B:
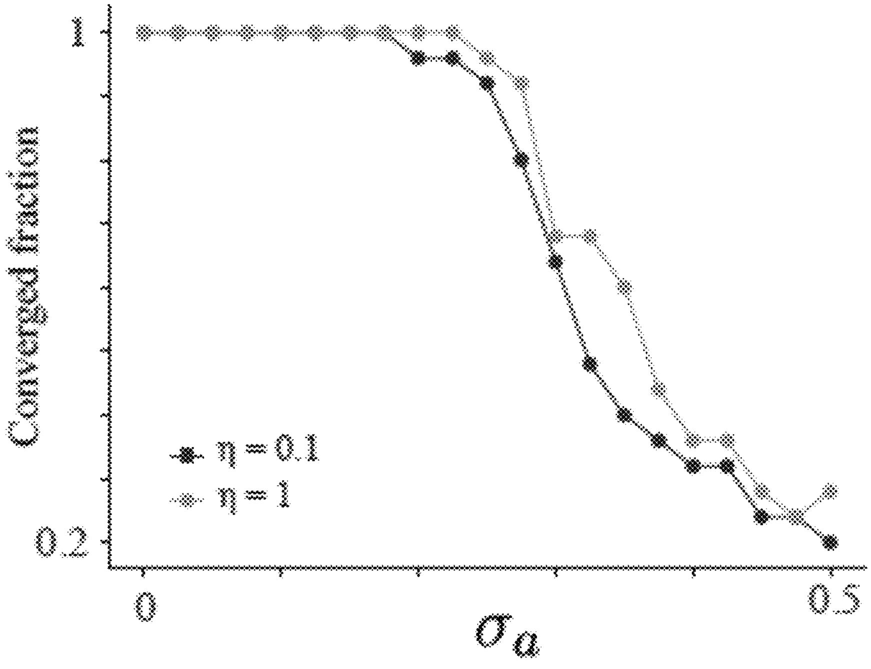

Adding defects to the network's activation functions had a relatively small effect on the training time (FIG. 18A). Even with relatively large variations in the activation functions ($\sigma_a=0.25$), the network only took about twice as much time to fully train the NIST7×7 dataset. FIG. 18B illustrates converged fraction versus the standard deviation ($\sigma_a$) of the logistic function parameters.

Dataset Results

PMGD system and method in accordance with embodiments of the present invention was compared with backpropagation on a variety of tasks for different network architectures and hyperparameters. Tables 4 and 5 provide a comparison of the accuracies obtained with PMGD and backpropagation for different datasets and various hyperparameter choices ($\tau_\theta$, $\tau_p$, $\eta$, batch size), with $\tau_x$ fixed at 1.

TABLE 4

| Setup | | | Parameters | | | |
|---|---|---|---|---|---|---|
| Task | Network | $\|\theta\|$ | $\tau_\theta$ | $\tau_p$ | $\eta$ | batch size |
| 2-bit parity | 2-2-1 | 9 | 1 | 1 | 5 | 1 |
| N-I-S-T | 49-4-4 | 220 | 1 | 1 | 3 | 1 |
| N-I-S-T | 49-4-4 | 220 | 1 | 1 | 0.5 | 1 |
| Fashion-MNIST | 2-layer CNN | 14378 | 1 | 1 | 9 | 1000 |
| Fashion-MNIST | 2-layer CNN | 14378 | 10 | 1 | 9 | 1000 |
| Fashion-MNIST | 2-layer CNN | 14378 | 100 | 1 | 9 | 1000 |
| Fashion-MNIST | 2-layer CNN | 14378 | 1000 | 1 | 9 | 1000 |
| CIFAR-10 | 3-layer CNN | 26154 | 1 | 1 | 9 | 1000 |

TABLE 5

| Setup | | | Accuracy | | | | |
|---|---|---|---|---|---|---|---|
| Task | Network | $\|\theta\|$ | $10^4$ steps | $10^5$ steps | $10^6$ steps | $10^7$ steps | backprop |
| 2-bit parity | 2-2-1 | 9 | 100% | 100% | 100% | 100% | 100% |
| N-I-S-T | 49-4-4 | 220 | 38% | 81% | 94% | 97.7% | 99.8% |
| N-I-S-T | 49-4-4 | 220 | 22% | 45% | 93% | 98.7% | 99.8% |
| Fashion-MNIST | 2-layer CNN | 14378 | 34.2% | 66.3% | 79.3% | 83.5% | 88.6% |
| Fashion-MNIST | 2-layer CNN | 14378 | 34.3% | 66.3% | 79.2% | 83.4% | 88.6% |
| Fashion-MNIST | 2-layer CNN | 14378 | 35.3% | 66.3% | 77.7% | 84.7% | 88.6% |
| Fashion-MNIST | 2-layer CNN | 14378 | 35.3% | 59.6% | 79.1% | 86.1% | 88.6% |
| CIFAR-10 | 3-layer CNN | 26154 | 12% | 23% | 43.8% | 60.7% | 68% |

Parameter multiplexed gradient descent system and methods in accordance with embodiments of the present invention has several advantages over previous gradient descent systems and methods. With realistic timescales for emerging hardware, training using PMGD systems and methods in accordance with embodiments of the present invention is capable of training emerging hardware in orders of magnitude faster than backpropagation in terms of wall-clock time to solution on a standard GPU/CPU. The PMGD systems and methods in accordance with embodiments of the present invention allows the implementation of multiple optimization algorithms using a single, global, cost signal and local parameter updates. The algorithm used (e.g. finite-difference, coordinate-descent, SPSA, etc.) can be adjusted via the tuning of the PMGD time-constants, and can even be adjusted during training if desired. Because it is a model-free perturbative technique (sometimes called zeroth order optimization), it is applicable to a wide range of systems—it can be applied to both analog and digital hardware platforms, and it can be used in the presence of noise and device imperfections. This overcomes a major barrier to using hardware platforms based on emerging technologies, which are often difficult to train. The perturbative techniques of PMGD systems and methods in accordance with embodiments of the present invention can be used to train recurrent neural networks, spiking networks and other non-standard networks at small scale, and other neuromorphic hardware and other physical neural networks. PMGD systems and methods in accordance with embodiments of the present invention can also be implemented directly on-chip with local, autonomous circuits.

Parameter multiplexed gradient descent system and methods in accordance with one or more embodiments of the present invention can be adapted to a variety of configurations. It is thought that parameter multiplexed gradient descent system and methods in accordance with various embodiments of the present invention and many of its attendant advantages will be understood from the foregoing description and it will be apparent that various changes may be made without departing from the spirit and scope of the invention or sacrificing all of its material advantages, the form hereinbefore described being merely a preferred or exemplary embodiment thereof.

Those familiar with the art will understand that embodiments of the invention may be employed, for various specific purposes, without departing from the essential substance thereof. The description of any one embodiment given above is intended to illustrate an example rather than to limit the invention. This above description is not intended to indicate that any one embodiment is necessarily preferred over any other one for all purposes, or to limit the scope of the invention by describing any such embodiment, which invention scope is intended to be determined by the claims, properly construed, including all subject matter encompassed by the doctrine of equivalents as properly applied to the claims.

What is claimed is:

1. A multiplexed gradient descent system for training a neural network implemented in a neuromorphic hardware, said system comprising:

- an input layer comprising a first plurality of neurons configured to receive a plurality of input signals;
- a plurality of synaptic circuits for modulating at least one of a first plurality of neuromorphic hardware signals, wherein each of the plurality of synaptic circuit comprises a plurality of neuromorphic hardware elements for generating the at least one of the first plurality of the neuromorphic hardware signals, wherein the plurality of the neuromorphic hardware elements comprises a first plurality of neuromorphic hardware parameters for setting the modulation of the at least one of the first plurality of the neuromorphic hardware signals to a predetermined value;
- a second plurality of neurons for generating a second plurality of neuromorphic hardware signals from the modulated first plurality of the neuromorphic hardware signals, wherein each of the second plurality of the neuromorphic hardware signals is a nonlinear function of the at least one of the first plurality of the neuromorphic hardware signals;
- a third plurality of neurons for generating a plurality of output signals from the second plurality of the neuromorphic hardware signals, wherein the plurality of the output signals represent a prediction of the neural network in the neuromorphic hardware;
- a cost element for comparing the plurality of the output signals with a target output to generate a plurality of costs, wherein comparing the plurality of the output signals with the target output comprises applying a plurality of cost functions to the plurality of the output signals and the target output, wherein each of the plurality of the cost function is a measure of correspondence between at least one of the plurality of the output signals and the target output;
- a filter for extracting a plurality of modulated cost functions, wherein extracting the plurality of modulated cost functions comprises determining a plurality of modulations in the plurality of the costs;
- a transmitter for transmitting the plurality of the modulated cost functions to the first plurality of the neuromorphic hardware parameters;
- an optimizer in at least one of the plurality of the synaptic circuits, comprising:
  - a perturbator for applying a perturbation to at least one of the first plurality of the neuromorphic hardware parameters, wherein applying the perturbation modifies the first plurality of the neuromorphic hardware parameters to a second plurality of neuromorphic hardware parameters;
  - a receiver for receiving at least one of the plurality of the transmitted modulated cost functions; and
  - a correlator for extracting a partial cost gradient from the at least one of the plurality of the received modulated cost functions, wherein extracting the partial cost gradient from the at least one of the plurality of the received modulated cost functions comprises determining an error signal for at least one of the second plurality of the neuromorphic hardware parameters, wherein determining the error signal for the at least one of the second plurality of the neuromorphic hardware parameters comprises applying a multiplier signal to each of the plurality of the received modulated cost functions to correlate the plurality of the received modulated cost functions with the second plurality of the neuromorphic hardware parameters; and
- an updater in at least one of the plurality of the synaptic circuits for determining a parameter change for the at least one of the second plurality of the neuromorphic hardware parameters from the extracted partial cost gradient and updating the at least one of the second plurality of the neuromorphic hardware parameters with the parameter change to generate a third plurality of neuromorphic hardware parameters.

2. The multiplexed gradient descent system of claim 1, wherein the perturbation is a time-varying perturbation.

3. The multiplexed gradient descent system of claim 1, wherein the perturbation is a discrete perturbation.

4. The multiplexed gradient descent system of claim 3, wherein the perturbation is time-multiplexing.

5. The multiplexed gradient descent system of claim 3, wherein the perturbation is code-multiplexing.

6. The multiplexed gradient descent system of claim 1, wherein the perturbation is an analog perturbation.

7. The multiplexed gradient descent system of claim 6, wherein the perturbation is frequency multiplexing.

8. A multiplexed gradient descent method for training a neural network implemented in a neuromorphic hardware, the method comprising:

- receiving a first plurality of input signal from an input layer comprising a first plurality of neurons;
- modulating at least one of a first plurality of neuromorphic hardware signals generated by at least one of a first plurality of hardware elements in at least one of a plurality of synaptic circuits, wherein the at least one of the first plurality of neuromorphic hardware signals is modulated to a predetermined value set by a first plurality of neuromorphic hardware parameters;

applying a first perturbation to each of the first plurality of the neuromorphic hardware parameters, wherein the applying the perturbation modifies the first plurality of the neuromorphic hardware parameters to a second plurality of neuromorphic hardware parameters;

generating at a second plurality of neurons a second plurality of neuromorphic hardware signals from the modulated first plurality of the neuromorphic hardware signals, wherein each of the second plurality of the neuromorphic hardware signals is a nonlinear function of the at least one of the modulated first plurality of the neuromorphic hardware signals;

generating at a third plurality of neurons a plurality of output signals from the second plurality of the neuromorphic hardware signals, wherein the plurality of the output signals represent a prediction of the neural network in the neuromorphic hardware;

comparing at a cost element the plurality of the output signals with a target output to generate a plurality of costs, wherein comparing the plurality of the output signals with the target output comprises applying a plurality of cost functions to the plurality of the output signals and the target output, wherein each of the plurality of the cost function is a measure of correspondence between at least one of the plurality of the output signals and the target output;

extracting a plurality of modulated cost functions, wherein extracting the plurality of the modulated cost functions comprises determining a plurality of modulations in the plurality of the costs;

transmitting the plurality of the modulated cost functions to the second plurality of the neuromorphic hardware parameters;

receiving in at least one of the plurality of the synaptic circuits at least one of the plurality of the transmitted modulated cost functions;

extracting in at least one of the plurality of the synaptic circuits a partial cost gradient from the at least one of the plurality of the received modulated cost functions;

determining in at least one of the plurality of the synaptic circuits a parameter change for the at least one of the second plurality of the neuromorphic hardware parameters from the extracted partial cost gradient;

updating in at least one of the plurality of the synaptic circuits the at least one of the second plurality of the neuromorphic hardware parameters with the parameter change to generate a third plurality of neuromorphic hardware parameters;

updating the first perturbation to a second perturbation after a first predetermined time period;

repeating the extracting the partial cost gradient from the at least one of the plurality of the received modulated cost functions for a second predetermined time period; and receiving a second plurality of input signals and a second target output to the neuromorphic hardware after a third predetermined time period.

9. The multiplexed gradient descent method of claim 8, wherein extracting the partial cost gradient from the at least one of the plurality of the received modulated cost functions comprises determining an error signal for the at least one of the second plurality of the neuromorphic hardware parameters, wherein determining the error signal for the at least one of the second plurality of the neuromorphic hardware parameters comprises applying a multiplier signal to each of the plurality of the received modulated cost functions to correlate the plurality of the received modulated cost functions with the second plurality of the neuromorphic hardware parameters.

10. The multiplexed gradient descent method of claim 8, wherein the perturbation is time-multiplexing.

11. The multiplexed gradient descent method of claim 8, wherein the perturbation is code-multiplexing.

12. The multiplexed gradient descent method of claim 8, wherein the perturbation is frequency multiplexing.

13. A multiplexed gradient descent method for training a neural network implemented in a neuromorphic hardware, the method comprising:

receiving a first plurality of input signal from an input layer comprising a first plurality of neurons;

modulating at least one of a first plurality of neuromorphic hardware signals generated by at least one of a first plurality of hardware elements in at least one of a plurality of synaptic circuits, wherein the at least one of the first plurality of the neuromorphic hardware signals is modulated to a predetermined value set by a first plurality of neuromorphic hardware parameters;

generating at a second plurality of neurons a second plurality of neuromorphic hardware signals from the modulated first plurality of the neuromorphic hardware signals, wherein each of the second plurality of the neuromorphic hardware signals is a nonlinear function of the at least one of the modulated first plurality of the neuromorphic hardware signals;

generating at a third plurality of neurons a plurality of output signals from the second plurality of the neuromorphic hardware signals, wherein the plurality of the output signals represent a prediction of the neural network in the neuromorphic hardware;

comparing at a cost element the plurality of the output signals with a target output to generate a plurality of costs, wherein comparing the plurality of the output signals with the target output comprises applying a plurality of cost functions to the plurality of the output signals and the target output, wherein each of the plurality of the cost functions is a measure of correspondence between at least one of plurality of the output signals and the target output;

extracting a plurality of modulated cost functions, wherein extracting the plurality of modulated cost functions comprises determining a plurality of modulations in the plurality of the costs;

transmitting the plurality of the modulated cost functions to the first plurality of the neuromorphic hardware parameters;

optimizing in at least one of the plurality of the synaptic circuits at least one of the plurality of the transmitted modulated cost functions to determine a parameter change for the at least one of the first plurality of the neuromorphic hardware parameters; and updating the at least one of the first plurality of the neuromorphic hardware parameters with the parameter change to generate a second plurality of neuromorphic hardware parameters.

14. The multiplexed gradient descent method of claim 13, wherein the perturbation is a time-varying perturbation.

15. The multiplexed gradient descent method of claim 13, wherein the perturbation is a discrete perturbation.

16. The multiplexed gradient descent method of claim 13, wherein the perturbation is an analog perturbation.

17. The multiplexed gradient descent method of claim 13, wherein optimizing the transmitted modulated cost function comprises:

receiving at each of the plurality of the synaptic circuits the at least one of the plurality of the transmitted modulated cost functions;

applying a first perturbation to each of the first plurality of the neuromorphic hardware parameters;

extracting a partial cost gradient from the at least one of the plurality of the received modulated cost functions, wherein the extracting the partial cost gradient from the at least one of the plurality of the received modulated cost functions comprises determining an error signal for the at least one of the perturbed first plurality of the neuromorphic hardware parameters, wherein determining the error signal for the at least one of the perturbed first plurality of the neuromorphic hardware parameters comprises applying a multiplier signal to each of the plurality of the received modulated cost functions to correlate the plurality of the received modulated cost functions with the perturbed first plurality of the neuromorphic hardware parameters; and determining the parameter change for the at least one of the first plurality of the neuromorphic hardware parameters from the extracted partial cost gradient.

18. The multiplexed gradient descent method of claim 17, further comprising updating the first perturbation to a second perturbation after a first predetermined time period.

19. The multiplexed gradient descent method of claim 18, further comprising repeating the extracting the partial cost gradient from the at least one of the plurality of the received modulated cost functions for a second predetermined time period.

20. The multiplexed gradient descent method of claim 19, further comprising receiving a second plurality of input signals and a second target output to the neuromorphic hardware after a third predetermined time period.

* * * * *